(12) United States Patent
Nomura et al.

(10) Patent No.: US 8,406,978 B2
(45) Date of Patent: Mar. 26, 2013

(54) GAS TURBINE CONTROL METHOD AND DEVICE

(75) Inventors: Masumi Nomura, Yokohama (JP); Kozo Toyama, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 288 days.

(21) Appl. No.: 12/920,409

(22) PCT Filed: Apr. 10, 2009

(86) PCT No.: PCT/JP2009/057707
§ 371 (c)(1), (2), (4) Date: Sep. 22, 2010

(87) PCT Pub. No.: WO2010/035539
PCT Pub. Date: Apr. 1, 2010

(65) Prior Publication Data
US 2011/0004390 A1    Jan. 6, 2011

(30) Foreign Application Priority Data

Sep. 29, 2008  (JP) .................................. 2008-251256

(51) Int. Cl.
*G06F 19/00* (2006.01)
(52) U.S. Cl. ........................................ 701/100
(58) Field of Classification Search .................. 701/100
See application file for complete search history.

(56) References Cited

U.S. PATENT DOCUMENTS 6,645,653 B2 * 11/2003 Kashiwagi .................... 429/415
(Continued)

FOREIGN PATENT DOCUMENTS

| CN | 1611839 A | 5/2005 |
|---|---|---|
| CN | 1621671 A | 6/2005 |

(Continued)

OTHER PUBLICATIONS

International Preliminary Report on Patentability (Form PCT/IB/373, 2 sheets) of International Application No. PCT/JP2009/057707 dated Apr. 12, 2011, with Form PCT/ISA/237.

(Continued)

*Primary Examiner* — Thomas Tarcza
*Assistant Examiner* — Maceeh Anwari
(74) *Attorney, Agent, or Firm* — Westerman, Hattori, Daniels & Adrian, LLP

(57) ABSTRACT

Provided is a gas turbine control method and control device whereby a design performance and an operating state based on ideal fuel flow rate and air flow rate simulated at the time of designing can be maintained by preventing an operation deviated from an operating condition that is based on ideal fuel flow rate and air flow rate simulated by initial design values, in a gas turbine control method designed to search optimal operating conditions automatically using control inputs such as a pilot ratio. The gas turbine controller comprises a second database that stores load sensitivity, i.e. the correlation between the load amount of a gas turbine and control inputs such as a fuel flow rate, air flow rate, pilot fuel ratio, and top hat fuel ratio in the gas turbine, wherein the amount of load variation for at least one of control inputs, a fuel flow rate or an air flow rate supplied to a combustor is predicted according to operational conditions obtained by searching using the load sensitivity, regulation is made according to the prediction results, and the regulation results are stored in the second database.

4 Claims, 10 Drawing Sheets

U.S. PATENT DOCUMENTS

| | | | |
|---|---|---|---|
| 6,810,655 B2 | 11/2004 | Davis, Jr. et al. | |
| 6,990,432 B1 | 1/2006 | McCarthy, IV et al. | |
| 7,188,019 B2 * | 3/2007 | Nomura et al. | 701/100 |
| 7,425,380 B2 * | 9/2008 | Matoba et al. | 429/441 |
| 7,707,814 B2 * | 5/2010 | Sonoda et al. | 60/39.281 |
| 2005/0107942 A1 | 5/2005 | Nomura et al. | |

FOREIGN PATENT DOCUMENTS

| | | |
|---|---|---|
| CN | 1811306 A | 8/2006 |
| CN | 101078373 A | 11/2007 |
| JP | 8-246903 | 9/1996 |
| JP | 9-228853 A | 9/1997 |
| JP | 9-269107 A | 10/1997 |
| JP | 2003-232230 A | 8/2003 |
| JP | 2005-155590 A | 6/2005 |
| JP | 2008-25910 A | 2/2008 |

OTHER PUBLICATIONS

International Search Report of PCT/JP2009/057707, mailing date of May 19, 2009.

Chinese Office Action dated Oct. 30, 2012, issued in corresponding Chinese Patent Application No. 200980111641.1, with English translation (20 pages).

* cited by examiner

Fig. 8

| Time point | Bypass valve opening | Pilot ratio | Top-hat ratio | Ambient temperature | MW | 1st frequency band | 2nd frequency band | ... | n-th frequency band |
|---|---|---|---|---|---|---|---|---|---|
| $t_1$ | $X_{11\text{-}1}$ | $X_{12\text{-}1}$ | $X_{13\text{-}1}$ | $X_{21\text{-}1}$ | $X_{22\text{-}1}$ | $Y_{11\text{-}1}$ | $Y_{12\text{-}1}$ | ... | $Y_{1n\text{-}1}$ |
| $t_2$ | $X_{11\text{-}2}$ | $X_{12\text{-}2}$ | $X_{13\text{-}2}$ | $X_{21\text{-}2}$ | $X_{22\text{-}2}$ | $Y_{11\text{-}2}$ | $Y_{12\text{-}2}$ | ... | $Y_{1n\text{-}2}$ |
| ... | ... | ... | ... | ... | ... | ... | ... | ... | ... |
| $t_n$ | $X_{11\text{-}n}$ | $X_{12\text{-}n}$ | $X_{13\text{-}n}$ | $X_{21\text{-}n}$ | $X_{22\text{-}n}$ | $Y_{11\text{-}n}$ | $Y_{12\text{-}n}$ | ... | $Y_{1n\text{-}n}$ |

Actuating variables: Bypass valve opening, Pilot ratio, Top-hat ratio
Uncontrollable state variables: Ambient temperature, MW
Process variables Fig. 9
|  | 1st frequency band | | ... | n-th frequency band | |
|---|---|---|---|---|---|
| 1st priority | Bypass valve | Open | ... | Top-hat ratio | Decreased |
| 2nd priority | Pilot ratio | Increased | ... | — | — |
Fig. 10
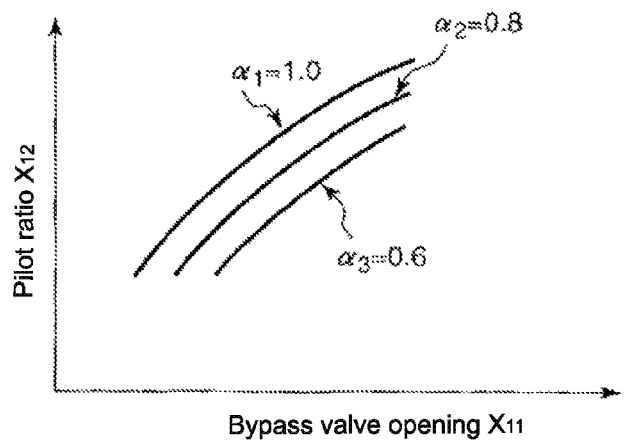
Fig. 11
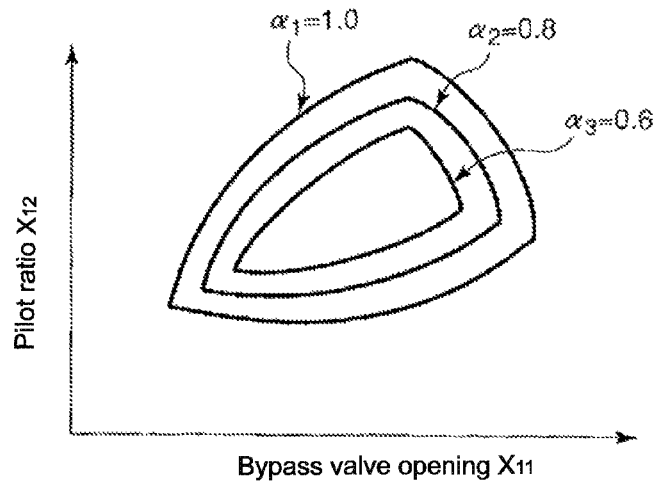

GAS TURBINE CONTROL METHOD AND DEVICE

BACKGROUND OF THE INVENTION

1. Field of the Invention

The present invention relates to a control method and a control device of a gas turbine. More concretely, the present invention relates to a gas turbine control method and a control device thereof for controlling the gas turbine so as to prevent the gas turbine from being operated under an irregular condition due to an adjustment operation for restraining combustion vibrations during the operation of the gas turbine, which is a condition deviated from a regular operation condition based on an ideal fuel flow rate and airflow rate that are simulated at the design stage of the gas turbine.

2. Background of the Invention

For instance, in a gas turbine driving a generator (an AC generator), the airflow rate and the fuel flow rate toward the combustors of the gas turbine are determined based on the load (the power required by the generator), the ambient temperature, the ambient humidity and so on; and, the airflow rate and the fuel flow rate at-least-one point on the operation line such as a rated operation point are fine adjusted in the trial operation of the gas turbine so that the fine-adjusted airflow rate and fuel flow rate are used as the initial design data or a protocol condition. However, the period of the trial operation is limited only within a predetermined certain time span; as a matter of course, the trial operations cannot be performed for all the weather conditions that the gas turbine is supposed to encounter. In addition, the actual airflow rate and the fuel flow rate of the gas turbine after the commissioning thereof may deviate from those at the design stage or the trial operation stage due to the secular change such as the deterioration of the compressor performance or the clogging of filters.

On the other hand, the gas turbine is driven by the combustion gas produced through the continuous exothermic oxidation reaction between the fuel and the air supplied into the combustors; thereby, the combustion occasionally accompanies the combustion gas pressure fluctuations of a frequency from 10-Hz to several thousands-Hz, the combustion gas pressure fluctuations including: the combustion noise caused by the turbulent flow combustion due to the exothermic oxidation reaction, and the combustion vibration caused by the interaction between the heat dissipation due to the time lag from fuel evaporation to fuel combustion and the flame propagation speed change due to combustion gas diffusion and revolution.

When particular attention is paid to the combustion vibrations, it is recognized that the above-described interaction between the heat dissipation and the flame propagation speed change is the vibration source; and, resonance sometimes occurs between the natural frequencies regarding the interaction and the natural frequencies regarding the combustor as an air-column; thus, the combustion vibrations having own frequencies in a peculiar frequency range grow in the combustor. Such combustion vibrations as described are basically unavoidable, whether the strength of the vibration is greater or smaller; and, the strength level depends on the volume of the combustor, the geometry of the combustor, the combustion performance in relation to the combustion gas temperature, and so on.

The demand for further compact and high-powered gas turbines becomes remarkable nowadays. Accordingly, the combustion temperature becomes higher and higher. In order to cope with increased thermal stresses as a result of the increased temperature due to the load fluctuations of the gas turbine as well as the rapid temperature increase in the combustor, the heat resisting steel of high strength is used for the combustor and the members therearound; at the same time, in order to reduce the time and manpower regarding delivery, installation, inspection and so on, the configuration members of smaller thickness and lower rigidity are used, even though the strength itself of the member material is increased. As a result, in a case where unexpected excessive combustion vibrations occur, or in a case where the resonances between the combustion vibrations and the air-column vibrations in the combustor happen, a possibility arises that cracks may be produced on the combustor; the support member may be seriously damaged; the life expectancy as to the configuration members of the gas turbine or the combustor may be reduced.

Since such combustion vibrations as described hinder the operation of the gas turbine to a great extent, the countermeasures to restrain or evade the combustion vibrations are strongly required as far as possible, in view of plant protection and availability enhancement. Thus, it is essential that the skilled engineers take care of the control system of the gas turbine and confirm the operation stability several times a year so that the combustion stability is maintained and the combustion vibrations do not occur. This practice, however, increases maintenance cost as well as decreases operation availability.

Against the above-described problems, for instance, the patent reference 1 (JP1997-269107) discloses a combustor combustion vibration control device and a method thereof for restraining the combustion vibrations caused by the pressure fluctuations in the combustor, whereby the device and the method comprising: a frequency analyzing means or process in the case of the method invention that performs frequency analyses as to the pressure fluctuations of the combustion gas, a central processing means or process in the case of the method invention that computes the conditions to stabilize the combustion vibrations based on the frequency band in which the result of the pressure fluctuation frequency analyses exists, the pressure fluctuation frequency analyses being performed by the frequency analyzing means; a voltage amplification means or process in the case of the method invention that amplifies the outputted signals outputted by the central processing unit; a controlling means (or process in the case of the method invention) that transforms the amplified signals amplified by the voltage amplification means into the order signals to open/close the fuel valves, and transmits the order signals toward the fuel valves so as to control the fuel valve.

The combustion vibration control device and the method disclosed by the patent reference 1 treat with or are focusing on the combustion vibrations of a lower frequency. On the other hand, the frequencies of the combustion vibrations occurring in a gas turbine cover a range from a low frequency around 10-Hz to a high frequency of several thousands-Hz; moreover, a plurality of kinds of the combustion vibrations often occurs in a plurality of frequency bands at the same time. Accordingly, if the air fuel ratio as to the gas turbine operation is controlled based on the vibration countermeasure focusing on the low frequency band as per the approach disclosed by the patent reference 1 (JP1997-269107), then there is a possibility that the combustion vibration status in other frequency bands may become worse.

Against the background of the above-described problem, the applicants of this specification proposed a gas turbine control device for effectively restraining the combustion vibrations of the gas turbine, in the patent reference 2 (JP2005-155590); in the proposed approach, an order of priority is predetermined, the order of priority being related to which frequency band out of a plurality of frequency bands should be treated so as to restrain the combustion vibrations; in response to the predetermined priorities (priority orders), the gas turbine operation is adjusted so that the combustion vibrations in a higher priority frequency band is controlled; if there arises an operation condition change as to the gas turbine after the control adjustments, the database reflects the operation condition change; and, if similar combustion vibrations are experienced during the gas turbine operation, the data stored in the database can be effectively used so as to restrain the combustion vibrations. Further, in a case where sufficient data are not accumulated in the database just after the gas turbine plant is commissioned, the information data stored in a basic data section or a knowledge data section is used so as to restrain the combustion vibrations, the basic data section storing the information data as to the operation countermeasure data obtained from the operation of other gas turbines of the same type, the knowledge data section storing the information data as to the operation countermeasure data obtained from the experience of the skilled operators who are in charge of the gas turbine operation adjustments. Moreover, in a case where sufficient data to adjust the gas turbine operation are not accumulated because of the continuing stable operation condition for a long time span, the optimal operation conditions are automatically searched by periodically changing the actual operation conditions so as to accumulate the information data for the database. In this way, the gas turbine control device or the corresponding method for restraining the combustion vibrations is proposed in the patent reference 2 (JP2005-155590) so that the combustion vibrations are effectively restrained (controlled) even in a case where the combustion vibrations occur in a plurality of frequency bands.

Summing up the main points as to the patent reference 1, the control device and the method thereof treat with the combustion vibrations of a lower frequency; therefore, if the air fuel ratio as to the gas turbine operation is controlled based on the vibration countermeasure focusing only on the low frequency band, then there is a possibility that the combustion vibration status in other frequency bands may become worse.

On the other hand, according to the disclosure of the patent reference 2, the combustion vibrations relating to the high priority frequency bands can be effectively restrained; however, there may be still a problem; namely, unstable combustion phenomena may happen, for example, due to the aged deterioration of the gas turbine.

In order to evade this problem, according to the patent reference 2, the optimal operation conditions are automatically searched by periodically changing the actual operation conditions on the basis of the mathematical models that are represented by the accumulated (information) data in the control device or the database; further, new information data are retrieved through the automatic optimal operation condition searching so that the control adjustments are performed and the optimal operation condition is surely achieved. However, it is currently known that the automatic change of the actual operation conditions may become a potential cause of unpredictable load fluctuations.

The explanation is now given about the unpredictable load fluctuations as described above, by use of FIGS. 14, 15, 16 and 17. In FIG. 14, the lateral axis and the vertical axis denote the load and the pilot ratio, respectively; the pilot ratio hereby means the ratio of the pilot fuel flow rate to the total fuel flow rate as described later. As shown in FIG. 14, the pilot fuel ratio or its transition is usually predetermined with regard to the required load. Further, in FIG. 15, the lateral axis and the vertical axis denote the elapsed time and the pilot ratio, respectively. As shown in FIG. 15, the pilot ratio is automatically changed so that the pilot ratio fluctuates toward positive (+) adjustment direction as well as negative (−) adjustment direction; thereby, the information data as to the latest combustion vibration conditions are accumulated in the database; on the basis of the accumulated information data, the control is performed. Incidentally, hereafter, the term "automatic searching" will be used so as to mean obtaining the information data by changing an operation parameter such as the pilot ratio.

FIG. 16 shows a result of an operation condition, the result being brought by the adjustment of the pilot ratio; in FIG. 16, the lateral axis and the vertical axis respectively denote the load [unit %] and the pilot ratio, as is the case with FIG. 14. In FIG. 16, the line graph with the symbols ♦ is the same line graph as in FIG. 14, while the line graph with the symbols ■ shows the transition of the pilot ratio that is brought the automatic searching according to FIG. 15. Thus, the automatic searching, the automatic pilot ratio change as a change of a control input, results in a change of the line graph as to the pilot ratio transition as shown in FIG. 16. However, the automatic searching also brings unpredictable load fluctuations around the load to be kept constant, as shown in FIG. 17 where the lateral axis and the vertical axis denote the elapsed time and the load [unit %]. In this way, a gas turbine operation may be caused, the actual operation point being deviated from the ideal operation point at which the operation state variables such as the ideal fuel flow rate and the airflow rate are to be kept as the operation state variables determined at the initial design stage.

In view of the problems as described above, the present invention aims at providing a gas turbine control method and a device thereof, an optimal operation condition for the gas turbine being automatically searched, whereby the gas turbine is able to be prevented from continuing the operation status which is deviated from the ideal operating points regarding the actuating variables such as the ideal fuel flow rate or the airflow rate that are assumed in the design stage of the gas turbine, and the design performance and the design operation status that are assumed at the design stage in relation to the ideal fuel flow rate or the airflow rate as to the gas turbine are maintained.

DISCLOSURE OF THE INVENTION

In order to solve the above-described problems, the present invention discloses a gas turbine method provided with a gas turbine comprising:

a plurality of combustors, and a first database that memorizes an optimal operation condition as to each combustor; and the gas turbine control method is used for adjusting at least one of a fuel flow rate toward the combustor and an airflow rate toward the combustor in response to the optimal operation condition, in a manner that the optimal operation condition is searched by fluctuating at least one of the fuel flow rate and the airflow rate, while combustion vibrations are not occurring, and in a manner that the memory contents of the first database are renewed with the data as to the optimal operation condition that is obtained by the searching;

wherein, a second database is provided in which load sensitivity coefficients, which show a correlation between the actuating variables such as the fuel flow rate, the airflow rate, a pilot ratio and a top-hat ratio of the gas turbine, and a gas turbine power output, are memorized;

a load increment change in response to actuating variables of at least one of the fuel flow rate toward the combustor and the airflow rate toward the combustor is estimated according to the optimal operation conditions obtained by the searching by use of the load sensitivity coefficients; and at least one of the fuel flow rate and the airflow rate is adjusted on the basis of the estimation results, and the contents of the first database are renewed according to the results of the adjustments.

In response to the above, the present invention discloses a gas turbine control device, provided with a gas turbine having a plurality of combustors and a first database that memorizes an optimal operation condition as to each combustor, and a correction amount determining means for performing a search control for the purpose of adjusting at least one of a fuel flow rate toward the combustor and an airflow rate toward the combustor in response to the optimal operation condition;

in a manner that the optimal operation condition is searched by fluctuating at least one of the fuel flow rate and the airflow rate, while combustion vibrations are not occurring, and in a manner that the memory contents of the first database are renewed with the data as to the optimal operation condition that is obtained by the searching;

wherein, a second database is provided in which load sensitivity coefficients, which show a correlation between the actuating variables such as the fuel flow rate, the airflow rate, a pilot ratio and a top-hat ratio of the gas turbine, and a gas turbine power output, are memorized;

the correction amount determining means estimates a load increment change in response to actuating variables of at least one of the fuel flow rate toward the combustor and the airflow rate toward the combustor by use of the load sensitivity coefficients that are memorized in the second database, in response to the optimal operation condition obtained by fluctuating at least one of the fuel flow rate and the airflow rate during the search control; and at least one of the fuel flow rate and the airflow rate is adjusted on the basis of the estimation results, thereby the contents of the first database are renewed according to the results of the adjustments.

Thus, in performing the automatic searching as to the optimal operation condition, the load sensitivity coefficients are made use of, thereby the load sensitivity coefficients are the indices that teach how the gas turbine load (power output) changes in response to an actuating variable such as the fuel flow rate, the airflow rate the pilot ratio and the top-hat ratio; the load increment change in response to the increment change of at least one of the fuel flow rate toward the combustor and the airflow rate toward the combustor is estimated according to the searched operation condition; at least one of the fuel flow rate and the airflow rate is adjusted on the basis of the estimation results. Consequently, the gas turbine according to the present invention can continue normal operation states in which the fuel flow rate or airflow rate does not deviate from the ideal condition (or standard operating points/ standard operating line or zone) that is assumed in the initial design stage.

A preferable embodiment according to the present invention is the gas turbine control method according to the above, the load sensitivity coefficients are calculated on the basis of the actuating variables, operation status signals and a gas turbine load while the gas turbine is being operated, in which the actuating variables include the airflow rate, the pilot ratio and the top-hat ratio, and the operation status signals include atmosphere conditions and the gas turbine load, and the calculated load sensitivity coefficients are memorized and renewed in a second database.

2. Another device embodiment according to the present invention is a gas turbine control device having a gas turbine comprising a plurality of combustors and a first database that memorizes an optimal operation condition as to each combustor, and a correction amount determining means for performing a search control for the purpose of adjusting at least one of a fuel flow rate toward the combustor and an airflow rate toward the combustor in response to the optimal operation condition;

in a manner that the optimal operation condition is searched by fluctuating at least one of the fuel flow rate and the airflow rate, while combustion vibrations are not occurring, and in a manner that the memory contents of the first database are renewed with the data as to the optimal operation condition that is obtained by the searching;

wherein the gas turbine control device further comprising:

a sensitivity analyzing means for calculating load sensitivity coefficients, which show a correlation between the actuating variables such as the fuel flow rate, the airflow rate, a pilot ratio and a top-hat ratio of the gas turbine, and a gas turbine power output; and a second database in which the load sensitivity coefficients calculated by the sensitivity analyzing means are memorized, further wherein the correction amount determining means estimates a load increment change in response to actuating variables of at least one of the fuel flow rate toward the combustor and the airflow rate toward the combustor by use of the load sensitivity coefficients calculated by the sensitivity analyzing means or the load sensitivity coefficients that are memorized in the second database, in response to the optimal operation condition obtained by fluctuating at least one of the fuel flow rate and the airflow rate during the search control; and at least one of the fuel flow rate and the airflow rate is adjusted on the basis of the estimation results, thereby the contents of the first database are renewed according to the results of the adjustments.

Thus, the load sensitivity coefficients are calculated while the gas turbine is being operated; the sensitivity analyzing means is provided in order to perform the load sensitivity coefficients calculation. Hence, the intricate procedures for calculating the sensitivity coefficients by manpower are dispensed with; the sensitivity coefficients are automatically calculated concurrently even when the secular change as to the gas turbine performance appears. In this way, the gas turbine can keep and enhance the combustion stability.

Further, as described above, in the gas turbine control device and the method thereof according to the present invention thereby an actuating variable such as the pilot ratio is artificially changed and optimal operation conditions are searched, the method and the device making use of the load sensitivity coefficients; according to the operation conditions obtained by the searching, the load increment change in response to the increment change of at least one of the fuel flow rate toward the combustor and the airflow rate toward the combustor is estimated by use of the load sensitivity coefficients; at least one of the fuel flow rate and the airflow rate is adjusted on the basis of the estimation results. Thus, contrary to the conventional ways, the gas turbine according to the present invention can continue normal operation states in which the fuel flow rate or airflow rate does not deviate from the ideal condition (or standard operating points/standard operating line or zone) that is assumed in the initial design stage.

Further, the load sensitivity coefficients are calculated while the gas turbine is being operated; the sensitivity analyzing means is provided in order to perform the load sensitivity coefficient calculation. Hence, the intricate procedures for calculating the sensitivity coefficients by manpower are dispensed with; the sensitivity coefficients are automatically calculated concurrently even when the secular change as to the gas turbine performance appears. In this way, the gas turbine can keep and enhance the combustion stability.

BRIEF DESCRIPTION OF THE DRAWINGS

FIG. 8 shows a configuration example as to a database used in the first embodiment according to the present invention;

FIG. 9 shows a configuration example as to a database used in the second embodiment according to the present invention;

FIG. 10 will be used in explaining a principle of the estimation method as to the combustion vibration zone;

FIG. 11 will be used in explaining an example of the estimated combustion vibration zone;

DETAILED DESCRIPTION OF THE PREFERRED EMBODIMENTS

Hereafter, the present invention will be described in detail with reference to the embodiments shown in the figures. However, the dimensions, materials, shape, the relative placement and so on of a component described in these embodiments shall not be construed as limiting the scope of the invention thereto, unless especially specific mention is made.

First Embodiment

Figure 12:
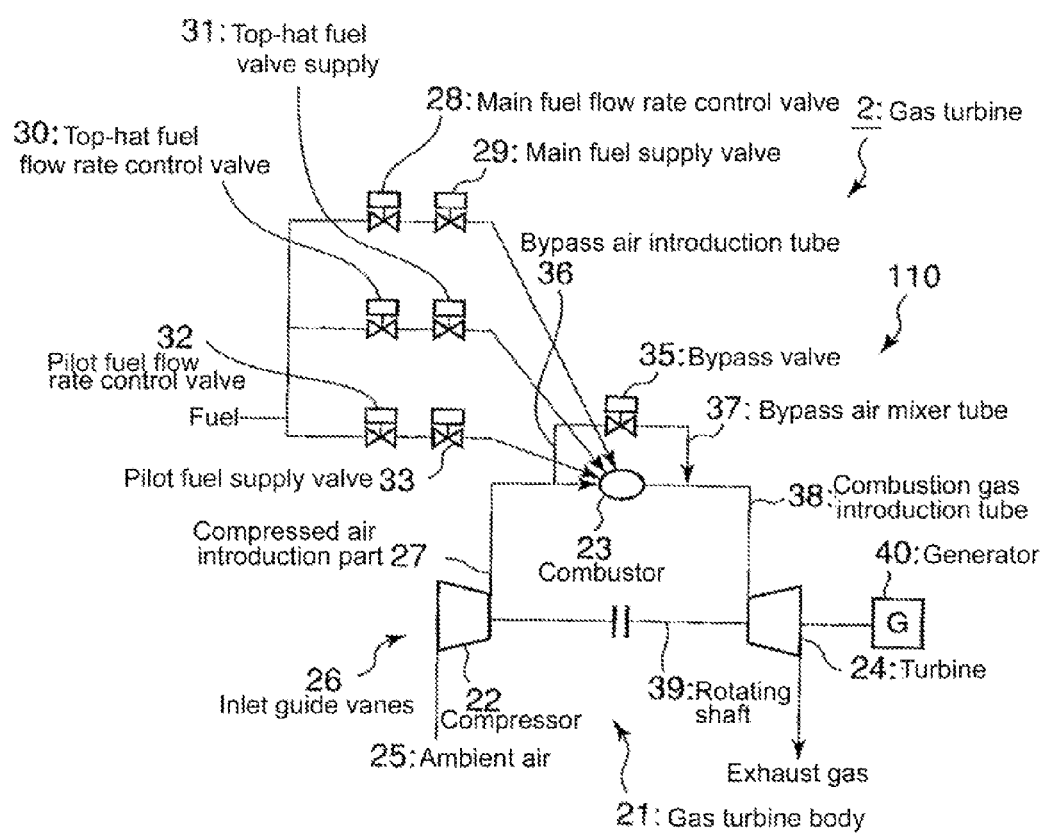
FIG. 12 shows an outline drawing for explaining a gas turbine configuration.
Figure 13:
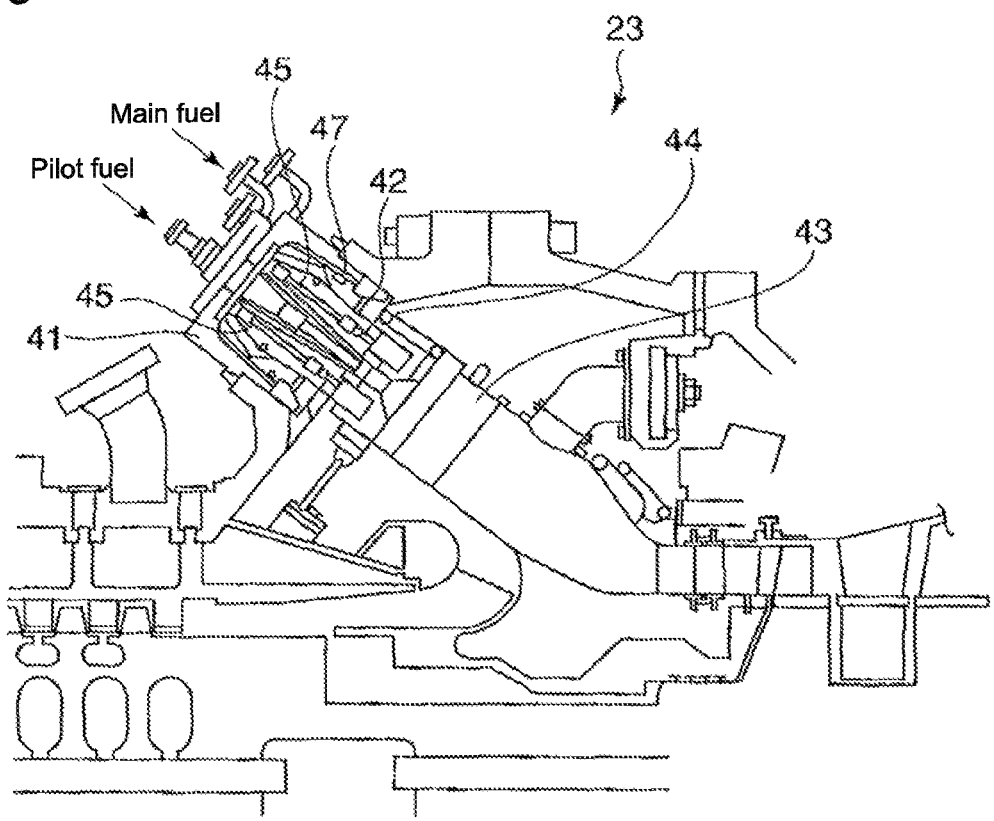
FIG. 13 shows a cross-section of a combustor of the gas turbine, the cross section showing an outline configuration as to the combustor.
Figure 14:
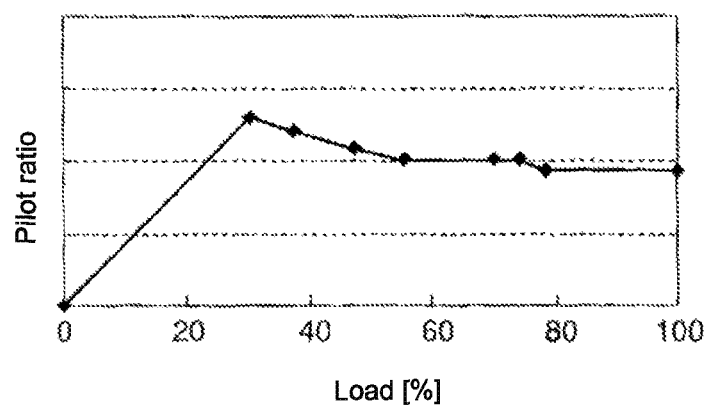
FIG. 14 shows an example as to the control parameter according to the conventional technology.

In the first place, a gas turbine 2 is briefly explained in relation to FIG. 12 that shows the configuration of the gas turbine 2 as well as FIG. 13 that shows the outline cross section as to the configuration of the combustor of the gas turbine 2. As shown in FIG. 12, the gas turbine comprises a compressor 22 having a plurality of inlet guide vanes 26, and a gas-turbine body 21 having a turbine 24 connected to the compressor 22 and to a generator 40 as an example of a driven gear, via a rotating shaft 39, thereby a combustor 23 supplies the combustion gas to the turbine 24 through a combustion gas introduction tube 38, and the combustion gas is discharged outside through a piping system.

The rotational movement of the turbine 24 is transferred to the compressor 22 through the rotating shaft 39. The compressor inhales ambient air 25 through an air suction port provided with a filter (not shown) for generating compressed air, and the generated compressed air is supplied to the combustor 23 through a compressed air introduction part 27 so that the compressed air is used for the combustion in the combustor.

Further, adjusting the attack angle of the plurality of inlet guide vanes 26 provided in the compressor 22 can control the flow rate of the air to be supplied to the compressor 22, even if the revolution speed of the compressor is constant.

The combustor 23 is communicated with the compressed air introduction part 27, a bypass air introduction tube 36, a bypass valve 35, and a bypass air mixer tube 37; thereby, the compressed air introduction part 27 is a space through which the compressed air discharged from the compressor 22 is guided to the bypass air introduction tube 36 connected to the combustor 23 or the inside of a body casing of the combustor 23; thus, the compressed air introduction part guides the air discharged from the outlet of the compressor toward the combustor 23. An end of the bypass air introduction tube 36 is connected to the compressed air introduction part 27 without a throttle, a choke or, a kind of valve or the like at the connection point, while another end of the bypass air introduction tube 36 is connected to the bypass valve 35 that controls the flow rate of the air passing through the bypass air introduction tube 36 so that a part of the compressed air discharged from the compressor 22 bypasses the combustor 23 and flows toward the turbine 24. In addition, the bypass air mixer tube 37 connected to the other side of the bypass valve 35 communicates with the combustion gas introduction tube 38 so that the air passing through the bypass valve 35 is sent into the combustion gas introduction tube 38 and mixed with the combustion gas formed in the combustor 23.

Further, supplied to the combustor 23 are: main fuel via at least one main fuel flow rate control valve 28 and at least one main fuel supply valve 29; top-hat fuel via at least one top-hat fuel flow rate control valve 30 and at least one top-hat fuel supply valve 31; and pilot fuel via at least one pilot fuel flow rate control valve 32 and at least one pilot fuel supply valve 33. An end (a fuel inlet side end) of the main fuel flow rate control valve 28 is connected to a pipe that feeds fuel toward the gas turbine from an outside fuel source while another end (a fuel delivery side end) of the main fuel flow rate control valve 28 is connected to a pipe that communicates with the main fuel supply valve 29, thereby the main fuel flow rate control valve 28 controls the flow rate of the fuel from the outside fuel source toward the combustor 23 and the main fuel supply valve 29 controls the fuel flow rate of the fuel toward a main burner (main fuel nozzle) of the combustor 23.

An end (a fuel inlet side end) of the top-hat fuel flow rate control valve 30 is connected to a pipe that feeds fuel toward the gas turbine from an outside fuel source while another end (a fuel delivery side end) of the top-hat fuel flow rate control valve 30 is connected to the top-hat fuel supply valve 31, thereby the top-hat fuel flow rate control valve 30 controls the flow rate of the fuel from the outside fuel source toward the combustor 23, and the top-hat fuel supply valve 31 controls the fuel flow rate of the fuel toward a top-hat burner. An end (a fuel inlet side end) of the pilot fuel flow rate control valve 32 is connected to a pipe that feeds fuel toward the gas turbine from an outside fuel source while another end (a fuel delivery side end) of the pilot fuel flow rate control valve 32 is connected to the pilot fuel supply valve 33, thereby the pilot fuel flow rate control valve 32 controls the flow rate of the fuel from the outside fuel source toward the combustor 23, and the pilot fuel supply valve 33 controls the fuel flow rate of the fuel toward a pilot burner.

As shown in FIG. 13, a pilot fuel nozzle 44 is provided at a central part of a combustor inner tube 42; a plurality of main fuel nozzles 45 is provided so as to surround the pilot fuel nozzle 44; a plurality of top-hat nozzles 47 is provided between the inner tube 42 and an outer casing 41, the top-hat nozzles 47 comprising multiple kinds of fuel nozzles. The pilot nozzle 44 is a fuel nozzle to perform diffusion combustion for the purpose of stabilizing combustion, and the main fuel nozzle 45 provided around the pilot fuel nozzle 44 is a fuel nozzle to perform premixed combustion, which burns the fuel gas ejected from the main fuel nozzles premised with the compressed air at the upstream of the combustion area, for the purpose of reducing NOx. The top-hat nozzle 47 is a fuel nozzle to perform premixed combustion, which burns the fuel gas ejected from the top-hat nozzles 47 premixed with the compressed air at the upstream of the combustion area that is further upstream than the case of the main fuel nozzle 45, for the purpose of further reducing NOx. The plurality of top-hat nozzles 47 is provided at the further outer periphery of the main fuel nozzles 45. Incidentally, the element with the numeral 43 in FIG. 13 is a tail pipe of the combustor.

Again in FIG. 12, the compressor 22 compresses the suction air inhaled from the outside and supplies the compressed air to each combustor 23. A part of the fuel inputted into the gas turbine reaches the pilot fuel supply valve 33 and the top-hat fuel supply valve 31 of each combustor 23 via the pilot fuel flow rate control valve 32 and the top-hat fuel flow rate control valve 30 respectively, and then, the fuel is guided into the combustor 23. The rest of the whole fuel reaches the main fuel supply valve 29 of each combustor 23 via the main fuel flow rate control valve 28, and then, the fuel is guided into the combustor 23. The guided air and fuel are burned in the combustor 23, generating the combustion gas that is guided into the turbine 24 and rotates the turbine 24; thereby the generator 40 transforms the rotational energy of the turbine into electric power.

Figure 1A:
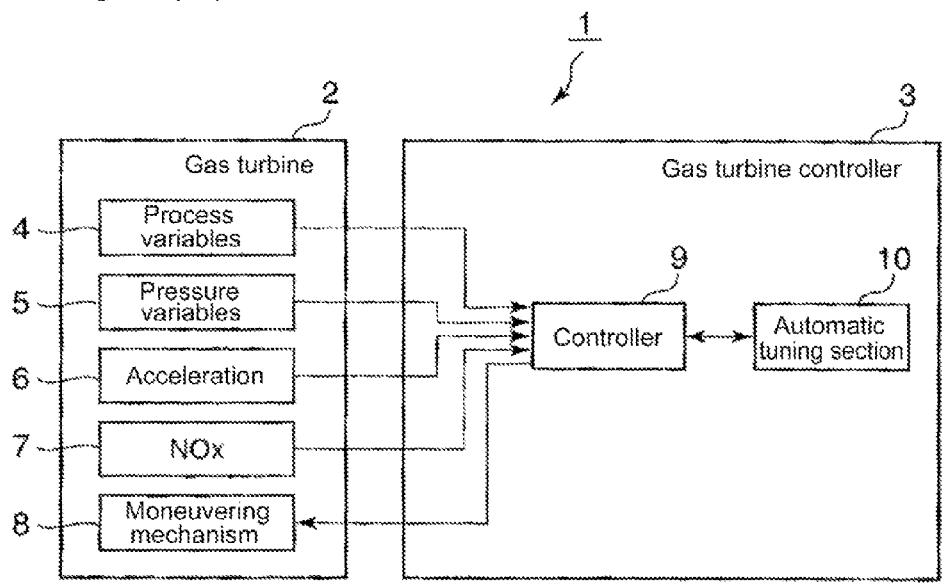
FIG. 1(A) is a block diagram that depicts the functional configuration for controlling a gas turbine 2, in performing the gas turbine control method according to the present invention.
Figure 1B:
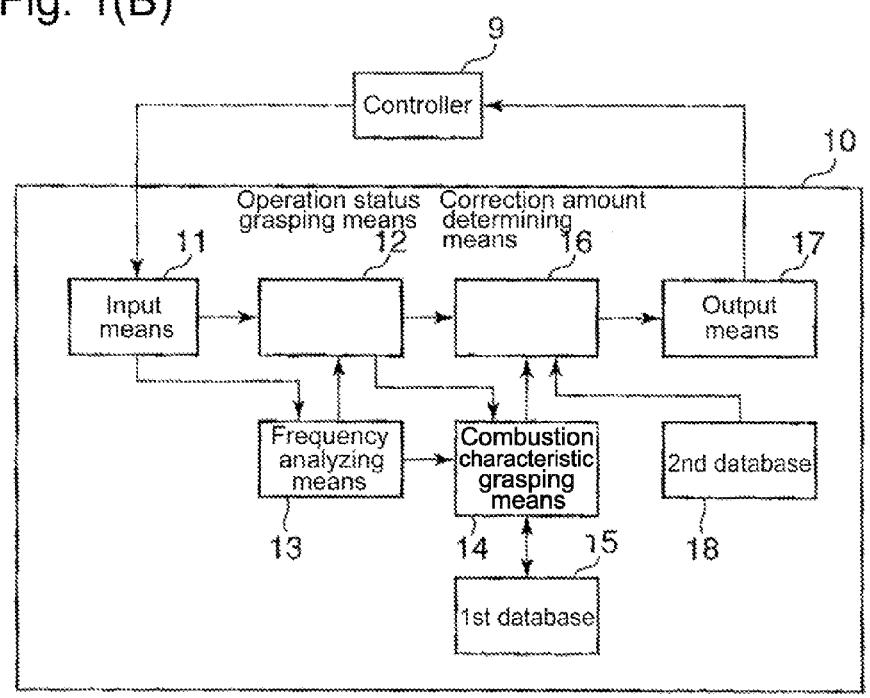
FIG. 1(B) is a detailed block diagram as to an automatic tuning section 10 in a gas turbine controller 3 as depicted in FIG. 1(A)

FIG. 1(A) is a block diagram that depicts the functional configuration for controlling the gas turbine 2, in performing the gas turbine control method according to the present invention. FIG. 1(B) is a detailed block diagram as to an automatic tuning section 10 in a gas turbine controller 3 as depicted in FIG. 1(A). As shown in FIG. 1(A), in order that the gas turbine controller 3 controls the gas turbine 2, the gas turbine is provided with a process variable measurement device 4, a pressure variation measurement device 5, an acceleration measurement device 6, a NOx measuring device 7, and a maneuvering mechanism (an operating system) 8.

The process variable measurement device 4 comprises a plurality of measuring instruments for measuring a plurality of process variables that indicate operation conditions or operating status during the operation of the gas turbine 2; and, each of the instruments are arranged at a pertinent component (or a part) of the gas turbine.

The measured result regarding each instrument is outputted to a controller 9 in the gas turbine controller 3 at each time point of a series of the predetermined time points t1, t2, . . . . Hereby, the process variables are, for instance, generating power (current or voltage), ambient temperature, ambient humidity, fuel flow rates and fuel pressures at various points in the fuel supply system, airflow rates and air pressures at various points in the air system, combustion gas temperature at the combustor 23 (FIG. 12), combustion gas flow rates, combustion gas pressure, rotating speeds of the compressor 22 or the turbine 24, emission component concentrations, notably nitrogen oxide (NOx) or carbon monoxide (CO) in the exhaust gas emitted from the turbine 24, and so on. In addition, these process variables are classified into two groups: "manipulated variables (controllable plant variables or actuating variables)" such as fuel amount or air amount to be supplied to the gas turbine 2, that are manipulatable; and "uncontrollable state variables" such as weather data like ambient temperature, or generator power output (e.g. MW output) determined by the load required from the outside system, that cannot be manipulated.

The pressure variation measurement device 5 is a pressure sensor that is fitted to each one of the multiple combustors 23, and outputs the data as to the pressure variations that occur due to the combustion in each combustor 23, into the gas turbine controller 3, at each time point of a series of the predetermined time points t1, t2, . . . , according to the order issued by the controller 9. The acceleration measurement device 6 that is fitted to each one of the multiple combustors 23 is an accelerometer that outputs the data as to the vibration accelerations (the second degree differentiation of position coordinate with respect to time) caused by the combustion in each combustor 23, into the gas turbine controller 3, at each time point of a series of the predetermined time points t1, t2, . . . , according to the order issued by the controller 9. The NOx measuring device 7 is a measuring instrument that measures the NOx concentration in the exhaust gas emitted from each combustor 23, and outputs the data as to the NOx concentration, into the gas turbine controller 3, at each time point of a series of the predetermined time points t1, t2, . . . , according to the order issued by the controller 9.

The maneuvering mechanism 8 is an operating system that manipulates the variables such as the openings as to the main fuel flow rate control valve 28 and the main fuel supply valves 29, the openings as to the top-hat fuel flow rate control valve 30 and the top-hat fuel supply valve 31, the openings as to the pilot fuel flow rate control valve 32 and the pilot fuel supply valves 33, the opening as to the bypass valve 35, and the rotary vane angle as to the inlet guide vane 26 for the compressor 22, thereby the maneuvering mechanism 8 controls the variables such as the main fuel flow rate, the top-hat fuel flow rate, the pilot fuel flow rate, the flow rate of the air supplied to each combustor 23, and the flow rate of the air guided into the compressor 22. In addition, the control of the flow rate of the air to be supplied to each combustor 23 is performed, to be more precise, by increasing (or decreasing) the opening of the bypass valve 35 at each combustor 23 so that the flow rate of the air through the bypass valve is increased (or decreased), thereby the flow rate of the air to be supplied to the combustor 23 is controlled.

The gas turbine controller 3 is provided with the controller 9 and the automatic tuning section (a search control section) 10. The controller 9 retrieves the measured data outputted from the process variable measurement device 4, the pressure variation measurement device 5, and the acceleration measurement device 6, and forwards the retrieved data to the automatic tuning section 10. Further, based on the order from the automatic tuning section 10, the controller 9 outputs the signals that the maneuvering mechanism 8 uses to manipulate the main fuel flow rate control valve 28, the main fuel supply valve 29, the top-hat fuel flow rate control valve 30, the top-hat fuel supply valve 31, the pilot fuel flow rate control valve 32, the pilot fuel supply valve 33, the bypass valve 35, and the inlet guide vane 26.

FIG. 1(B) is a detailed block diagram of the automatic tuning section 10 in a gas turbine controller 3 as depicted in FIG. 1(A). The numerals 11,12,13,14,15,16,17 and 18 denote an input means 11, an operation status grasping means 12, a frequency analyzing means 13, a combustion characteristic grasping means 14, a first database 15, a correction amount determining means 16, an output means 17, and a second database 18 respectively. The automatic tuning section 10 configured with these components as just described controls the manipulated variables (controllable plant variables) or the process variables so as to correct these variables toward the most effective correction paths (directions) and correction amounts (scalar amounts as to the directions), against the generated combustion vibrations.

The automatic tuning section 10 receives at the input means 11 the data such as the process variables, pressures, and accelerations the data which is forwarded, by the function of the controller 9 from the process variable measurement device 4, the pressure variation measurement device 5, and the acceleration measurement device 6 respectively those which were forwarded from the controller 9; then, by use of the results as to the vibration frequency analysis of the gas turbine 2 obtained by the frequency analyzing means 13, the operation status grasping means 12 of the automatic tuning section 10 grasps the operation status (as to combustion) of the gas turbine 2 as well as the combustion characteristic grasping means 14 of the automatic tuning section 10 grasps the combustion vibration characteristics of each combustor 23. Based on these data grasped by the operation status grasping means 12 and the combustion characteristic grasping means 14, a correction amount determining means 16 of the automatic tuning section establishes a measure to evade potential combustion vibration in the gas turbine 2, the measure includes a decision about whether or not the gas turbine components such as the main fuel flow rate control valve 28, the main fuel supply valve 29, the top-hat fuel flow rate control valve 30, the top-hat fuel supply valve 31, the pilot fuel flow rate control valve 32, the pilot fuel supply valve 33, the bypass valve 35, and the inlet guide vane 26 are adjusted (fine-tuned), as well as what adjustments should be taken into consideration (what components should be adjusted) and how far or which direction the adjustments should be extended in a case where any adjustment as to the controllable variables should be performed. The above-described decision result of the correction amount determining means 16 of the automatic tuning section 10 is outputted into the controller 9 by the output means 17.

Further, as will be described later, based on the contents of:

the database information that is related to the combustion status change in the combustor, the database information including the data of the variables in the first database as depicted in FIG. 8;

the analyzed information that is analyzed on the basis of the information stored in the database, the analyzed information being stored in a basic data section (not shown);

the adjustment experience information that associates the content of each adjustment in the past with the corresponding operation status change in the gas turbine 2, the corresponding operation status change being derived from in response to each adjustment, the adjustment experience information being stored in a form as described in FIG. 9;

the mathematical expression models that expresses the standard combustion characteristics as to the gas turbine;

the constraint condition information that expresses the constraint conditions as to the gas turbine;

the operation experience information that is related to the gas turbine operation records;

the operator experience information that is related to the operation experience knowledge accumulated on the basis of the experience (know-how) of skilled operation adjustment engineers, the operator experience information associating an operation malfunction symptom (indication) with an effective countermeasure against the malfunction, the operator experience information being stored in a knowledge data section (not shown), a correction amount determining means 16 calculates a desirable correction amount regarding the concerned variable and the controller so as to restrain combustion vibrations in a case where the combustion vibrations occur.

Thus, the gas turbine is controlled so as to respond to a gas turbine load change in a manner where the to-be-given correction amount as to each control input (each actuating variable) is estimated in consideration of the influence coefficient (i.e. sensitivity coefficient) of the control input over the load change recovery, by use of the information data stored in the second database 18; thereby, the gas turbine load change (or load change recovery) due to multiple control inputs (multiple actuating variables) can be estimated so that the gas turbine responds to the load change from the power demand side.

Figure 5A:
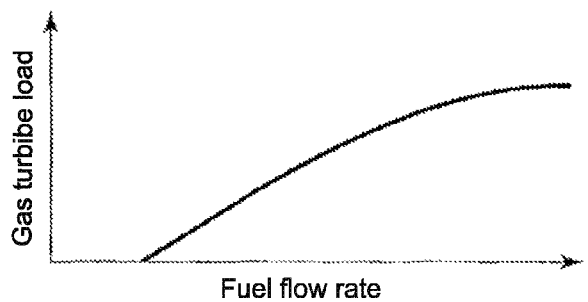
FIG. 5(A) will be used in explaining an example relation between the gas turbine load and the fuel flow (feeding) rate, namely, the gas turbine load with respect to the fuel flow rate, in the gas turbine control method according to the present invention.
Figure 5B:
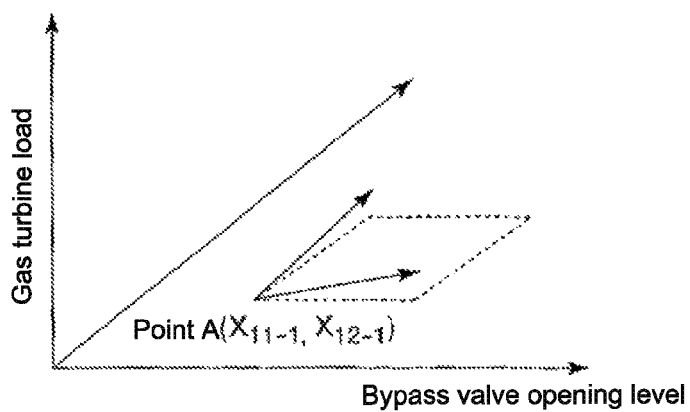
FIG. 5(B) will be used in explaining an example relation as to how the gas turbine load is influenced by a pair of control inputs (i.e. by a combination of actuating variables) such as a pair of the pilot ratio and the bypass valve opening level, the pilot ratio being defined as a ratio of the pilot fuel flow rate to the whole fuel flow rate.

In consultation with FIGS. 5(A) and 5(B), a brief explanation is now given about the load sensitivity as to an actuating variable or as to a pair of actuating variables. FIG. 5(A) shows an example relation between the gas turbine load and the fuel flow rate; and FIG. 5(B) shows an example relation as to how the gas turbine load is influenced by a pair of control inputs (i.e. by a combination of actuating variables) such as a pair of the pilot ratio and the bypass valve opening level, the pilot ratio being defined as a ratio of the pilot fuel flow rate to the whole fuel flow rate. In FIG. 5(A), the lateral axis denotes the fuel flow rate, and the vertical axis denotes the load demanded on the gas turbine 2; it is hereby noted that, because fuel is required not only for sending the power output to the outer power-demand side but also for simply rotating the rotating shaft 39, the power is not generated unless the fuel is inputted into the gas turbine to a certain degree. Therefore, the load is increased when the fuel flow rate is increased after the fuel flow rate reaches a certain level, and the gas turbine generates 100% load-power by inputting fuel of a rated fuel flow rate into the gas turbine.

In FIG. 5(B), the X-axis denotes the bypass valve opening level, the Y-axis denotes the pilot ratio and the Z-axis denotes the load of the gas turbine. In FIG. 5(B), the point A is located in the X-Y plane. The X coordinate and the Y coordinate of the point A are $X_{11-1}$ (a bypass valve opening level) and $X_{12-1}$ (a pilot ratio), respectively; two slope vectors (arrows) that start from the point A toward the outside of X-Y plane are shown in FIG. 5(B). One of the arrows (slope vectors) is placed parallel to the X-Z plane, and the slope or the partial differential coefficient of the arrow against the X-Y plane indicates how the gas turbine load changes in response to the change of the bypass valve opening level, while the other arrow (slope vectors) is placed parallel to the Y-Z plane, and the slope or the partial differential coefficient of the arrow against the X-Y plane indicates how the gas turbine load changes in response to the change of the pilot ratio. In other words, the slope indicates the load sensitivity coefficient as to an actuating variable such as the bypass valve opening level or the pilot ratio.

Further, supposing that the correction amount as to the bypass valve opening level be ΔX, and the correction amount as to the pilot ratio be ΔY, the sensitivity as to the bypass valve opening level be $\alpha_{11}$, and the sensitivity as to the pilot ratio be $\alpha_{12}$, the correction amount as to the gas turbine load, namely, ΔLGT can be estimated by the following equation (1).

$$\Delta LGT = \alpha_{11} \cdot \Delta X + \alpha_{12} \cdot \Delta Y \quad (1)$$

The gas turbine load correction amount ΔLGT obtained by the equation (1) is outputted into the controller 9, and, by spuriously issuing a signal to respond to the demand load change from the controller 9, the change as to the gas turbine power-output can be compensated. Incidentally, the above-described load sensitivity coefficients are stored (memorized) in the second database 18; thereby, the sensitivity coefficients may be memorized in a pattern using an equation such as the equation (1), in a pattern using a graphic expression such as the graph in FIG. 5(B), or in a pattern using direct alpha-numerical data. Further, in the above equation (1), the gas turbine load correction amount ΔLGT is given in a linear expression as to two actuating variables (i.e. the correction amounts as to the bypass valve opening level and the pilot ratio); naturally, the expression may be a linear expression as to three or more actuating variables including the top-hat ratio and so on; moreover, the expression may be a non-linear expression including the high order term of more than or equal to 2 order.

Thus far, the outline configuration of the gas turbine control method and device according to the present invention is explained; the present invention aims at the method and device in which the optimal operation condition is automatically searched by changing actuating variables such as the pilot ratio as described above, increment by increment, so that the gas turbine is prevented from continuing irregular operation states in which the fuel flow rate or airflow rate deviates from the ideal condition (or standard operating points/standard operating line or zone) that is assumed in the initial design stage.

In this way, the present invention comprises:

the frequency analyzing means 13 that analyzes the pressure fluctuations or the accelerations of the combustors in the gas turbine;

the combustion characteristic grasping means 14 that grasps the characteristics in relation to the combustion vibrations of the gas turbine on the basis of the analysis results obtained by the frequency analyzing means, as well as on the basis of the status signals including the information data regarding the actuating variables comprising the airflow rate, the pilot ratio and the top-hat ratio in the gas turbine, as well as, regarding the state variables comprising the atmospheric condition variables and the load index variables in the gas turbine;

the gas turbine controller 9 for the gas turbine operation control that adjusts at least one of the fuel flow rate or the airflow rate so that the combustion vibrations are restrained when the combustion characteristic grasping means 14 grasps the combustion vibrations in the gas turbine;

the second database 18 that stores the sensitivity coefficients as to the actuating variables such as the fuel flow rate, the airflow rate the pilot ratio and the top-hat ratio, against the gas turbine power output, each sensitivity coefficient being a partial derivative of the generator power output with respect to the actuating variable, or the sensitivity analyzing means 19 that calculates the sensitivity coefficients and updates the data thereof in the second database;

wherein an optimal gas turbine operation condition is searched by fluctuating at least one of the fuel flow rate toward the combustor 23 and the airflow rate toward the combustor, while the controller 9 is not performing the control adjustments to restrain the combustion vibrations;

the influence on the power output of the gas turbine the influence which is derived by at least one of the fuel flow rate and the airflow rate is estimated, by use of the sensitivity coefficients stored in the second database 18 or by use of the sensitivity coefficients calculated by the sensitivity analyzing means 19; and, at least one of the fuel flow rate and the airflow rate is adjusted on the basis of the estimation results.

In addition, if the stable operation state continues, the data as to the operation adjustments cannot be collected even if the gas turbine goes through the aged deterioration. Thus, in this invention, the operation conditions (the actuating state variables) are forced to change at predetermined time period in order that the optimal operation condition is automatically searched. Accordingly, the above-described difficulty such as the possibility of the unexpected load fluctuations due to the automatic searching for the optimal operation conditions in the conventional gas turbines is eliminated. The difficulty is experienced in a case where the controller tries to effectively restrain the combustion vibrations in multi frequency bands. Thus, in conventional gas turbines, the gas turbine often continues irregular operation states in which the fuel flow rate or airflow rate deviates from the ideal condition (or standard operating points/standard operating line or zone) that is assumed in the initial design stage.

On the contrary to the above, the gas turbine according to the present invention comprises:

the second database 18 that stores the sensitivity coefficients as to the actuating variables such as the fuel flow rate, the airflow rate, the pilot ratio and the top-hat ratio, against the gas turbine power output, each sensitivity coefficient being a partial derivative of the generator power output with respect to the actuating variable; and the sensitivity analyzing means 19 that calculates the sensitivity coefficients and updates the data thereof in the second database;

wherein, an optimal gas turbine operation condition is automatically searched, while the controller 9 is not performing the control adjustments to restrain the combustion vibrations;

the influence on the power output of the gas turbine the influence which is derived by at least one of the fuel flow rate and the airflow rate is estimated, by use of the sensitivity coefficients stored in the second database 18 or by use of the sensitivity coefficients calculated by the sensitivity analyzing means 19; and, at least one of the fuel flow rate and the airflow rate is adjusted on the basis of the estimation results.

Accordingly, the difficulty in the conventional gas turbines, i.e. the possibility of the unexpected load fluctuations due to the automatic searching for the optimal operation conditions, can be evaded. Further, the gas turbine according to the present invention can continue normal operation states in which the fuel flow rate or airflow rate does not deviate from the ideal condition or standard operating points/standard operating line or zone that is assumed in the initial design stage.

Figure 2:
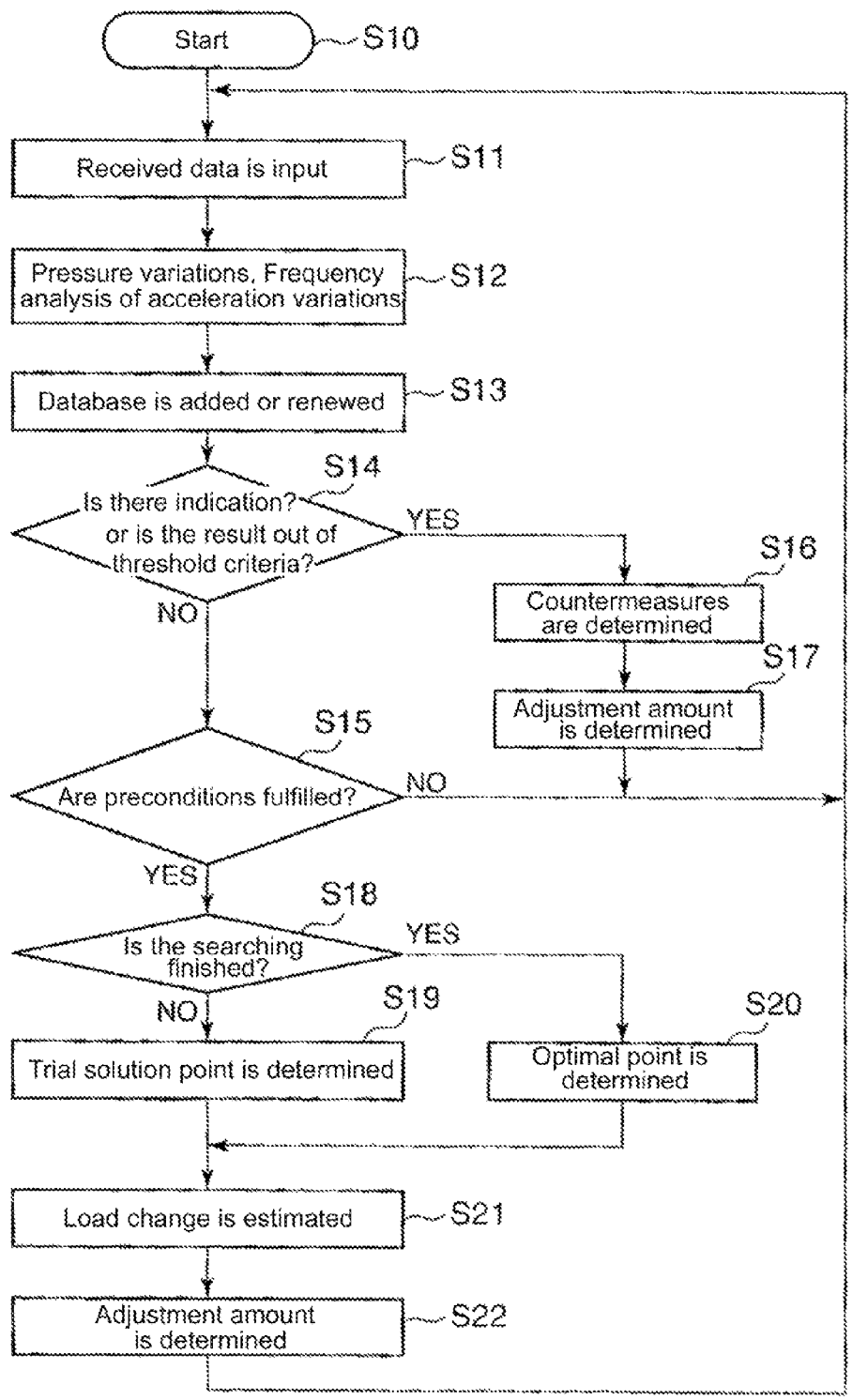
FIG. 2 shows a flow diagram as to a gas turbine control method of a first embodiment according to the present invention.

FIG. 2 shows a flow diagram as to the gas turbine control method according to the first embodiment of the present invention; the computer-based program that operates the gas turbine 2 is performed on the basis of the flow diagram; the program executes a series of processes every predetermined interval of time while the gas turbine 2 is operated.

When the step S11 following the step S10 (a starting step) in FIG. 2 is executed, the input means 11 receives the data as to the process variables, the pressures and the accelerations, from the process variable measurement device 4 (shown in FIG. 1(A)), the pressure variation measurement device 5 (shown in FIG. 1(A)), the acceleration measurement device 6 (shown in FIG. 1(A)) and the NOx measuring device 7 (shown in FIG. 1(A)), via the controller 9; and, the input means 11 sends the received data to the operation status grasping means 12 and the frequency analyzing means 13.

Further, the operation status grasping means 12 grasps the properties of the fuel supplied to the gas turbine 2, the properties being measured by the process variable measurement device 4; the operation status grasping means also investigates the presence or absence of the abnormalities (or the deviations from the regular conditions) about the operating conditions of the gas turbine 2. The reason why the diagnosis items include the fuel properties is that the fuel properties may change with time; for instance, in the fuel stored in a tank (not shown), the heavier constituent molecules go down in the tank as time goes by, while the lighter molecules go up; as a result, the properties (e.g. calorific value) of the fuel supplied to the gas turbine 2 vary in response to the change of the fuel level in the tank, the level being an indicator as to the remaining fuel amount. Thus, the process variable measurement device 4 of the present invention is provided with a calorific heat estimation device or a fuel component analyzer on the fuel system between the fuel tank and the gas turbine 2. The operation status grasping means 12 determines the adjustment values regarding the increase or decrease of the air-fuel ratio, based on the obtained data as to the fuel calorific values and the fuel components.

Incidentally, the calorific heat estimation or the fuel component analysis as described above may usually be performed in real time; however, the data acquisition can be performed in non-real time. In other words, a table or a chart for determining the adjustment values may be prepared in advance; thereby, the table or the chart may reflect the relation between the fuel level in the tank and the fuel component change, the relation being grasped by measurements in advance. In such cases, the process variable measurement device 4 also measures the fuel level in the tank, and the adjustment values based on the measurement data are used in increasing or decreasing the fuel-air ratio. Even in a case where the fuel is supplied from not a fuel tank but an outside piping system, the real time measurement approach or the non-real time measurement approach can be similarly used.

The diagnosis as to whether abnormalities are present or absent in the gas turbine 2 is performed based on the data acquired by the process variable measurement device 4; namely, whether or not the gas turbine 2 is operated in a regular operating condition is judged based on the data such as the temperature or the flow rate at the concerned part of the gas turbine. For instance, it is judged that the operating state of the gas turbine 2 is in disorder, if the temperature of some particular part or location in the gas turbine 2 reaches or exceeds, or falls below, a predetermined threshold; and, the operation status grasping means 12 informs an operator or a group in charge of the gas turbine operation that the machine is in disorder, by use of an annunciator means such as an alarm or a warning lamp.

Figure 6:
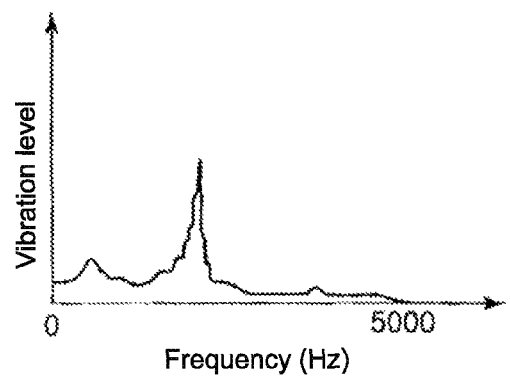
FIG. 6 is a graph showing an example as to an analyzing result according to a frequency analyzing means of the present invention.

When no abnormality is recognized, the frequency analyzing means 13 performs frequency analyses of the pressure variations or the acceleration variations in the step 12 that follows the step 11 in FIG. 2. Further, the frequency analyzing means 13 makes a diagnosis of the pressure sensors and the acceleration sensors; namely, based on the pressure variations (i.e. vibrations) measured at each combustor 23 by use of the pressure variation measurement device 5, the frequency analyzing means 13 performs frequency analyses (e.g. FFT analysis) as to the variations. FIG. 6 is an example of the result as to the frequency analyses performed by the frequency analyzing means 13, based on the measured data according to the pressure variation measurement device 5. In FIG. 6, the lateral axis relates to frequency, while the vertical axis shows vibration strength (vibration level). In addition, the frequency analyzing means 13 performs the frequency analyses as to the measured acceleration data according to the acceleration measurement device 6.

As shown in FIG. 6, the combustion vibration (pressure vibration or acceleration variation) in the combustor 23 includes a plurality of vibration frequency components; each of the frequency components is derived from complicated factors; namely, the vibration in response to each frequency cannot be uniformly restrained by adjusting only one controllable variable parameter. Further, the vibration effect on the gas turbine 2 differs from a frequency to a frequency, meaning even if a vibration of a certain level (a vibration amplitude or speed level) is allowable at a certain frequency, another frequency vibration of the same level at another frequency may have a fatal effect on the gas turbine. From these points of view, the operation control of the gas turbine 2 needs to be performed by more than two parameters (controllable variables) in regard to the concerned vibration frequency.

Figure 7:
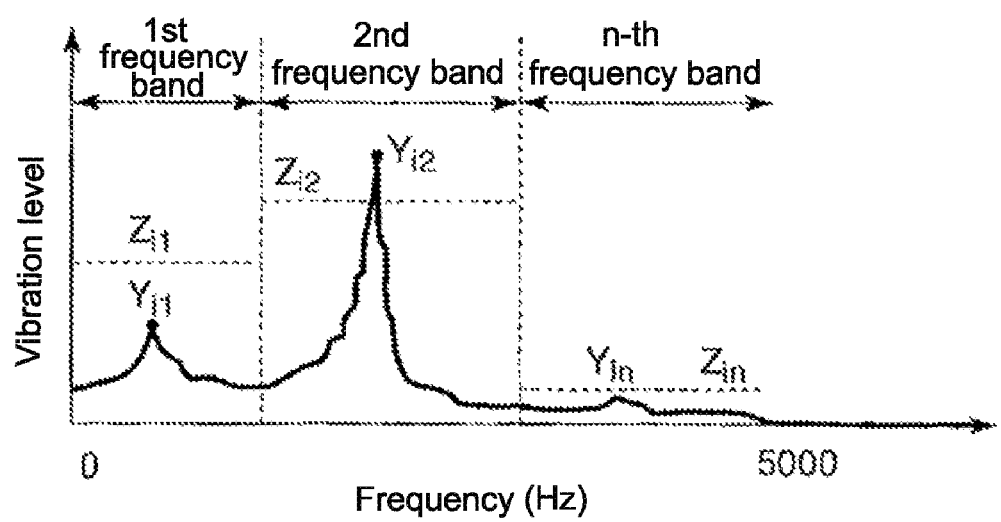
FIG. 7 is a graph showing an example as to an analyzing result by use of the frequency analyzing means of the present invention, the result being analyzed in each of a plurality of frequency bands.

Thus, as shown in FIG. 7, the frequency analysis result is outputted in multiple frequency bands (n frequency bands). The frequency band means a minimal frequency range unit in which the analysis results according to the frequency analyzing means 13 is summarized or put together. For instance, the vibration treated in FIG. 7 has vibration components of the frequencies mainly from 0 Hz to 5 kHz; thereby, the range 0 Hz to 5 kHz is divided into small ranges of an appropriate number n. If a small range (bands) is taken every 50 Hz width, the number n becomes 100; in addition, the bandwidth needs not to be of a constant size. In the way as described above, the frequency analyzing means 13 outputs the frequency analysis results obtained regarding the pressures or the acceleration per each divided band into the frequency analyzing means 12.

Further, the frequency analyzing means 13 makes a diagnosis as to whether abnormalities are present or absent in the gas turbine 2 by use of the pressure sensors of the pressure variation measurement device 5 or the acceleration sensors of the acceleration measurement device 6, and the frequency analyzing means 13 makes a diagnosis also of the pressure sensors, the acceleration sensors and the data transfer system themselves, thereby the data are inputted through the data transfer system into the input means 11. This diagnosis function is provided because the normal control becomes difficult in a case there is an abnormality in relation to the pressure sensors in the acceleration sensors and the data transfer system. For instance, if the data to be analyzed include the noises due to the power source frequency component (e.g. 60 Hz noise component), the random noises over all the frequency bands or the noise of a rectangular pulse as a direct current component of less than several tens of Hertz, the frequency analysis result curve as depicted in FIG. 6 deviates from the proper curve being raised upward entirely over the frequency bands. On the contrary, if the sensing function as to the pressure sensors and the acceleration sensors is deteriorated, the frequency analysis result curve as depicted in FIG. 6 deviates downward from the proper curve, entirely over the frequency bands. Thus, the frequency analyzing means 13 judges whether or not the measured vibration levels are in a predetermined range; if not, it is estimated that the pressure sensors, the acceleration sensors or the data transfer system is out of order. In addition, the disorder as to the data transfer system can be easily recognized by setting a threshold as to the above described upward or downward shifting in contrast to the vibration frequency analysis result obtained by the frequency analyzing means 13 as depicted in FIG. 6.

Further, the frequency analyzing means 13 may be provided with a plurality of pressure sensors and acceleration sensors so that, by comparing the measured data among the pressure sensors and the acceleration sensor, it may be judged whether or not an abnormality occurs regarding the pressure sensors, the acceleration sensor, or the data transfer system from the pressure sensors or the acceleration sensor to the input means 11. Further, since the acceleration measurement device 6 detects the vibrations (as the accelerations) of each combustor 23, the acceleration measurement device 6 may be used as a monitor of the vibrations of the multiple combustors 23; thereby, even if the sensor of the pressure variation measurement device 5 provided at each combustor 23 is regarded as being in an abnormal state, the acceleration measurement device 6 can detect the combustion vibration of the combustor. In addition, in a case where at least two acceleration measurement devices 6 detecting the combustion vibrations are provided, whether or not there is a combustion vibration occurrence can be evaluated by the multiple devices 6 as a redundant system. Thus, the reliability of the judgment as to the combustion vibration occurrence can be enhanced.

Back to FIG. 2, the explanation is continued. As described above, the frequency analysis is performed, the frequency analysis in the step 12 is executed, and then the result of the frequency analysis is added or renewed in the first database 15 in step 13. The data to be accumulated in the first database 15 are stored in a predetermined form, for instance, in a form as described in FIG. 8 where the process variables (including controllable and uncontrollable variables) are expressed with symbols $X_{11-1}, X_{11-2}, \ldots, X_{11-n}, X_{12-1}, X_{12-2}, \ldots, X_{22-n}$,
and the maximum value of vibration strength in each frequency band is expressed with symbols $Y_{i1-1}, Y_{i1-2}, \ldots, Y_{i1-n}, Y_{i2-1}, X_{i2-2}, \ldots, X_{in-n}$.
Hereby, it is noted that the data as to the process variables and the maximum value of vibration strength in each frequency band are generated and stored at a series of time points t1, t2, . . . ; and, the data are forwarded to the first database 15 via the controller 9 and the frequency analyzing means 13; thus, the data generated time to time are added to and stored in the first database 15.

The vibration strength data accumulated in the first database 15 may include only the pressure vibration data or the acceleration data, or both of the data. An example of data including process variable data accumulated in the database is shown in FIG. 8. At the row of a time point t1, the opening of the bypass valve 35, the pilot ratio (the ratio of the pilot fuel flow rate to the total fuel flow rate), the top-hat ratio (the ratio of the top-hat fuel flow rate to the total fuel flow rate), the ambient temperature, and the generator load (MW) are expressed with symbols $X_{11-1}, X_{21-1}, X_{13-1}, X_{21-1}$, and $X_{22-1}$ respectively. Further, the maximum vibration strength in the first frequency band, the maximum vibration strength in the second frequency band, and the maximum vibration strength in the n-th frequency band are expressed with the symbols $Y_{i1-1}, Y_{i2-1}$, and $Y_{in-1}$ respectively.

In a similar fashion, at a time point t2, the opening of the bypass valve 35, the pilot ratio, the top-hat ratio, the ambient temperature, and the generator load (MW) are expressed with symbols $X_{11-2}, X_{12-2}, X_{13-2}, X_{21-2}$, and $X_{22-2}$ respectively; further, the maximum vibration strength in the first frequency band, the maximum vibration strength in the second frequency band, and the maximum vibration strength in the n-th frequency band are expressed with the symbols $Y_{i1-2}, Y_{i2-2}$, and $Y_{in-2}$ respectively.

In the step S14 following the step S13, based on the frequency analysis results of the pressure vibrations or the accelerations by use of the operation status grasping means 12, it is evaluated whether or not further adjustments are immediately needed by referring to predetermined thresholds, in view of the frequency analysis results as to pressures or accelerations obtained by the operation status grasping means 12; or, it is evaluated whether or not there is an indication to take countermeasures as to the combustion vibrations, by referring to predetermined thresholds, even though an immediate action is not needed. If the above evaluation is affirmative (YES at the step S14 of FIG. 2), namely, in a case the frequency analysis results are out of the threshold criteria or the frequency analysis results present an indication that some countermeasures are needed, the step S14 is followed by the step S16 where the countermeasures as to the control parameter adjustments are determined.

In this step S16, the computation as to the characteristics of the combustion vibration occurring in the combustor is performed, the computation is to make an equation model for modeling the combustion characteristics with respect to the process variables inputted from the process variable measurement device 4 and the frequency analysis results inputted from the frequency analyzing means 13 as to the pressures and the accelerations per each frequency band, both the process variables and the frequency results being transferred in the first database 15 through the combustion characteristic grasping means 14.

For instance, supposing that the number of the divided frequency bands is n, and the number of the combustors is m; then, the pressure variations are modeled in the following equation (2) of multiple regression analysis:

$$Y_{ij} = a_{ij,0} + a_{ij,1} \times X_{11} + a_{ij,2} \times X_{12} + a_{ij,3} \times X_{21} + a_{ij,4} \times X_{22} \qquad (2),$$

whereby, $Y_{ij}$ means the maximum amplitude as to the i-th combustor and the j-th frequency band (i=1, 2, . . . m; j=1, 2, . . . , n);

$X_{11}$ means the value as to an actuating variable 1 (the opening of the bypass valve 35 in this example);

$X_{12}$ means an actuating variable 2 (the pilot ratio in this example);

$X_{21}$ means an uncontrollable state variable 1 a weather datum in this example);

$X_{22}$ means an uncontrollable state variable 2 (the generator output (MW) in this example); and, $a_{ij,0}$, $a_{ij,1}$, $a_{ij,2}$, $a_{ij,3}$, $a_{ij,4}$ are the coefficient parameters.

The combustion characteristic grasping means 14 computes the coefficients $a_{ij,0}$, $a_{ij,1}$, $a_{ij,2}$, $a_{ij,3}$, and $a_{ij,4}$ of the equation (2), by use of the data stored in the first database 15 that stores the state variables and the actuating variables, in order, at the series of time points (t1, t2, ... ) namely, by use of the values as to the maximum amplitudes $Y_{ij}$, the actuating variables $X_{11}$ and $X_{12}$, the uncontrollable state variables $X_{12}$ and $X_{21}$. In addition, the coefficients $a_{ij,0}$, $a_{ij,1}$, $a_{ij,2}$, $a_{ij,3}$, and $a_{ij,4}$ may be solved, for instance, by use of a least square method.

In the above description, in order to determine the maximum amplitudes $Y_{ij}$, the data measured by the pressure variation measurement device 5 and the acceleration measurement device 6 are A/D transformed in the frequency analyzing means 13 at first; the frequency analysis regarding the digitalized data is performed by the frequency analyzing means 13; then, the analyzed data are classified into the divided frequency bands. In each frequency band, frequency analyzed data are collected during a certain time period (e.g. over the time points (t1, t2, ... )); and, the maximum value of the collected data is the value $Y_{ij}$. FIG. 7 shows that the maximum amplitudes in the first, the second and the n-th bands are $Y_{i1}$, $Y_{i2}$ and $Y_{in}$, respectively.

In the above explanation, two actuating variables and two uncontrollable state variables are taken into consideration; as a matter of course, the selection of these variables are not limited to the above combination (i.e. two actuating variables and two uncontrollable state variables). Further, the polynomial equation of a higher degree instead of a linear expression in the equation (2) may be used in modeling the vibration model. Moreover, a non-linear model such as neural network models may be used. In the above example, the actuating variables $X_{11}$ and $X_{12}$, the uncontrollable state variables $X_{12}$ and $X_{21}$ are selected out of the measured data themselves; however, these variables may be of modified variables that are transformed from the directly measured data, on the basis of pertinent transform rules such as the mass conservation law or a mathematical-physical law.

In the next place, the combustion characteristic grasping means 14 identifies the area where combustion vibrations are prone to occur, by use of the equation model (2), the equation being obtained for each time point out of the series of time points (t1, t2, ... ). For instance, supposing that an actuating variable 1, an actuating variable 2, an uncontrollable state variable 1, and an uncontrollable state variable 2 are $X'_{11}$, $X'_{12}$, $X'_{21}$, and $X'_{22}$, respectively, the predicted value for the pressure variation in the i-th combustor and in the j-th frequency band can be obtained by the next equation (3).

$$Y'_{ij}=a_{ij,0}+a_{ij,1}\times X'_{11}+a_{ij,2}\times X'_{12}+a_{ij,3}\times X'_{21}+a_{ij,4}\times X_{22} \quad (3)$$

It is hereby noted that the coefficient parameters $a_{ij,0}$, $a_{ij,1}$, $a_{ij,2}$, $a_{ij,3}$, and $a_{ij,4}$ are already solved as described above, for instance, by use of a least square method.

As shown in FIG. 7, the maximum vibration amplitude value of the j-th frequency band (the 1st frequency band to the n-th frequency band) for the i-th combustor is provided with thresholds $Z_{i1}$, $Z_{i2}$, ... , and $Z_{in}$ corresponding to the frequency bands 1,2, ... , n, respectively, in view of the structure of the i-th combustor 23 and the surrounding structures. The thresholds $Z_{i1}$, $Z_{i2}$, ... , and $Z_{in}$, that are the values indicating the maximum allowable vibration strength for the each frequency band, are stored in the frequency analyzing means 13. These threshold values are determined, for example, based on conditions such as whether or not there is a member or a structure that causes the resonance with the combustor in the frequency band, whether or not there is a member or a structure that is prone to be damaged around the combustor in the frequency band, and how high the vibration level threshold (allowable limit) can be extended regarding a member or a structure around the combustor.

Given that the threshold value of the maximum vibration amplitude value of j-th frequency band of the i-th combustor sent from the frequency analyzing means 13 is $Z_{ij}$, the following equation (4) can be taken into consideration in relation to the variables $X'_{11}$, $X'_{12}$, $X'_{21}$, $X'_{22}$, and the value $Z_{ij}$ as a threshold value.

$$Z_{ij}=a_{ij,0}+a_{ij,1}\times X'_{11}+a_{ij,2}\times X'_{12}+a_{ij,3}\times X'_{21}+a_{ij,4}\times X_{22} \quad (4)$$

In the above equation (4), the variables $X'_{21}$, and $X'_{22}$ are the uncontrollable state variables which the controller 9 cannot manage to manipulate, namely, the variables $X'_{21}$, and $X'_{22}$ can be regarded as constants; thus, the unknowns in the equation (4) are only the two variables (the actuating variables) $X'_{11}$, and $X'_{12}$. Thus, the equation (4) becomes a relational expression between the two parameters $X'_{11}$, and $X'_{42}$. Therefore, the curve in a ($X'_{11}$, $X'_{12}$) plane can be easily obtained, thereby the coordinate pairs for the points on the curve satisfy the relation (4).

Further, it is hereby considered how the above-described curve is shifted in the ($X'_{11}$, $X'_{12}$) plane, when the threshold value $Z_{ij}$ is changed so that the value $Z_{ij}$ is multiplied by a plurality of gains $\alpha_k$ (k=1, 2 ... , p) that can be given by the controller 9. When an $\alpha_k$ is given, the threshold $Z_{ij}$ is changed into $\alpha_k Z_{ij}$; thus, instead of the equation (4), the following equation (5) is taken into consideration.

$$\alpha_k Z_{ij}=a_{ij,0}+a_{ij,1}\times X'_{11}a_{ij,2}\times X'_{12}+a_{ij,3}\times X_{21}+a_{ij,4}\times X_{22} \quad (5)$$

Also by use of the above equation (5), a relational expression between the two parameters $X'_{11}$, and $X'_{12}$ can be solved in response to each given gain $\alpha_k$, as is the case with the equation (4); namely, corresponding to the gains $\alpha_k$ (k=1, 2, ... , p) p curves are drawn in the two dimensional plane, in relation to each frequency band. An example for this consideration is depicted in FIG. 10. In FIG. 10, three curves corresponding to three gains 1.0, 0.8 and 0.6 are shown. In the case of FIG. 10, the upper side of each curve becomes an area where combustion vibrations are prone to occur (i.e. in the lower side area, the vibration is hard to happen), if the coefficient $a_{ij,2}$ is a positive number; on the contrary, the lower side of each curve becomes an area where combustion vibrations are prone to occur (i.e. in the upper side area, the vibration is hard to happen), if the coefficient $a_{ij,2}$ is a negative number. In other words, one side of the areas divided by the curve corresponds to the stable area where the combustion vibrations are difficult to occur, while the other side corresponds to the unstable area where the combustion vibrations are easy to occur.

By paying attention to a threshold $Z_{ij}$ and a gain value $\alpha_k$ as well as a frequency band and a combustor, it has been considered thus far that a curve can be drawn in the $X'_{11}$-$X'_{12}$ plane thereby one of the two areas divided the curve becomes a stable area as to the combustion vibrations. When some multiple constraint conditions out of a plurality of thresholds $Z_{ij}$ (i=1, 2, ... , m; j=1, 2, ... , n) as well as gains $\alpha_k$ (k=1, 2, ... , p) are selected, then a plurality of curves (lines) are obtained so that the curves (lines) border a stable operation region in the $X'_{11}$-$X'_{12}$ plane; thereby, in the formed region, the combustion vibrations are not prone to occur. In this way, the combustion characteristic grasping means 14 makes use of the variables from the controller 9 such as the maximum amplitude thresholds $Z_{ij}$ the gains $\alpha_k$, the actuating variables $X_{11}$, $X_{12}$ (not the uncontrollable state variables such as $X_{21}$, $X_{22}$) and the parameters $a_{ij,0}$, $a_{ij,1}$, $a_{ij,2}$, $a_{ij,3}$, and $a_{ij,4}$, so as to determine the regions where the operation is stable regarding the combustion vibrations.

FIG. 11 shows an example of the combustion vibration regions determined by the combustion characteristic grasping means 14, in which the lateral axis and the vertical axis relate to the variables $X_{11}$, $X_{12}$, respectively. In this example, a plurality of the regions are formed so that the boundary lines that border the stable regions are formed with a set of contour lines depicted as such, in response to a plurality of the gains $\alpha_k$. The occurrence of the combustion vibrations is less at the middle in the regions surrounded by the contour lines, than in the neighborhood of the boundaries (the outer-side boundaries) of the regions in which the combustion vibrations are prone to occur. In addition, for the sake of explanation convenience, FIG. 11 is expressed in a two-dimensional plane with regard to the two actuating variables. In a case where N actuating variables are taken into consideration, the stable regions are expressed in a N-th dimension space (a N-dimensional space).

In the next place, the correction amount determining means 16 determines the countermeasures (i.e. adjusting locations and adjusting amounts) in response to an operation adjustment order input by the operation status grasping means 12 so that the current operation status ($X_{11}=x_a$, $X_{12}=x_b$) is adjusted. In a case where a plurality of maximum amplitudes $Y_{ij}$ exceeds the corresponding threshold $Z_{i1}$, $Z_{i2}$ ... $Z_{ij}$ in a plurality of the frequency bands, the adjustments are performed for and from a frequency band of a higher priority as per the priorities (priority list) assigned in a basic data section (not shown) of the first database 15; thereby, the basic data section stores information about the mathematical model which is obtained through the frequency analysis results for the operation data collected from the same type gas turbines 2 that are already commissioned and in service, the model representing the standard combustion characteristics of the gas turbine; further, the basic data section stores information about the operation constraints or the limiting values (e.g. the air-fuel ratio limitation to evade misfires or back-fires) in operating the gas turbine 2. As an example in this context regarding the priorities, a highest priority is placed on the lowest frequency band; and the following priorities are placed on the higher frequency bands (e.g. one after another from the highest frequency band). The reason of this as to the priorities is that the possibility that the combustor is in a state where the combustion therein has a tendency to extinguish is high when the combustion vibrations occur at the lowest frequency band; further, in the higher frequency bands, the energy levels with regard to the combustion vibrations are higher, and the combustion vibrations are remarkably prone to cause damages to the combustor or the members around the combustor.

Further, after selecting the frequency bands in which the adjustments are performed, the correction amount determining means 16 determines which direction the current operation status ($X_{11}=x_a$, $X_{12}=x_b$) is to be adjusted, by use of an optimization approach such as a steepest ascent/descent method. It is noted that the optimization approach is not limited to this steepest ascent/descent method.

In a case where the combustion characteristic grasping means 14 cannot sufficiently recognize (or has not sufficiently recognized) the combustion characteristics, the correction amount determining means 16 can determine the above-described adjustment direction on the basis of the information data of a knowledge database (not shown) in the first database 15; the knowledge database accumulates the information data as to the previously performed adjustments and the operation status changes (as resulting changes) in the gas turbine 2 (including the same type gas turbines that are already tested or commissioned), the contents of the information being able to include the data as shown in FIG. 9. More specifically, according to FIG. 9, in the first priority adjustment as well as in relation to the first frequency band, the bypass valve is opened, and in the first priority adjustment as well as in relation to the n-th frequency band, the top-hat ratio is decreased. In the second priority adjustment as well as in relation to the first frequency band, the pilot ratio is increased, and in the second priority adjustment as well as in relation to the n-th frequency band, neither the top-hat ratio nor other control variables is adjusted. In a case where the first data base 15 has not sufficiently accumulated the information data, for example, just after the gas turbine 2 is installed, the correction amount determining means 16 can determine the direction of the adjustment on the basis of the standard mathematical equations as to the combustion characteristics, the constraint data and the learned information in the basic database or the knowledge database. In addition, the knowledge database may store the learned information data that are established based on the experience of the skilled operators; namely, the learned information data relates to the "symptoms and signs" that the skilled operators have recognized, and the effective countermeasures in response to the "symptoms and signs."

In this way, when the adjustment countermeasure and adjustment amount as to the control variables are determined, the output means 17 outputs the data as to the adjustment direction and amount determined by the correction amount determining means 16 toward the controller 9 in the step S17 in FIG. 2. Thus, based on the this described data, the controller 9 controls the maneuvering mechanism 8 so as to operate the main fuel flow rate control valve 28, the pilot fuel flow rate control valve 32, the top-hat fuel flow rate control valve 30, the bypass valve 35, the inlet guide vane 26, and so on, in order that the opening $X_{11}$ of the bypass valve, the pilot ratio $X_{12}$, and the top-hat ratio $X_{13}$ are adjusted (changed in the adjustment direction). In other words, based on the adjustment order issued from the output means 17, the controller 9 controls at least one of the to-be adjusted variables, namely, the main fuel flow rate control valve 28, the pilot fuel flow rate control valve 32, the top-hat fuel flow rate control valve 30, the bypass valve 35, and the inlet guide vane 26, so that the bypass valve opening $X_{11}$ is shifted from the coordinate $x_a$ to the coordinate $x_c$, the pilot ratio $X_{12}$ is shifted from the coordinate $x_b$ to the coordinate $x_d$, and the top-hat ratio $X_{13}$ is shifted from the coordinate $x_e$ to the coordinate $x_f$.

On the other hand, at the step S14 in the flow chart of FIG. 2 where the operation data are compared with control criteria or thresholds, if the operation status is judged to be within the control criteria and no indication as to the combustion vibrations appears, the step S14 is followed by the step S15 at which it is judged whether or not the following preconditions are fulfilled:

Condition 1: the power output of the generator 40 is in a stabilized state, the power output being maintained within predetermined thresholds for more than a prescribed time span;

Condition 2: no combustion vibration occurs for more than a prescribed time span;

Condition 3: the temperature of the air inhaled into the gas turbine is in a stabilized state, the temperature being maintained within predetermined thresholds for more than a prescribed time span;

Condition 4: the automatic searching permission mode in which the automatic control adjustment is selected by an authorized operator, and so on.

Further, if these preconditions are fulfilled and there is no change in the operation status, the step S15 is followed by the step S18 where it is judged whether or not the searching is finished. If the searching is judged to be finished at the step S18, the step S18 is followed by the step S20 where an optimal point (an optimal operation state variable vector) is determined out of the information data accumulated in the first database 15. Hereby, the term "optimal operation point" may mean an operation condition under which a highest combustion stability is achieved; or, it may mean an operation condition under which the optimal efficiencies as to the elements of the gas turbine system are achieved in addition to the highest combustion stability. Further, in the optimal criteria, a scale as to environment protection may be included; the gas turbine plant efficiency as an efficiency of the gas turbine combined cycle plant may be included there, in a case where the gas turbine system 1 configures a combined power-generating system. Further, it is not necessarily to determine the optimal point out of the data regarding the trial calculation results; another optimal point in the searching area may be selected by use of the searching-calculation based on not only linear equations but also multi regression analysis equation or algebraic polynomials.

Figure 15:
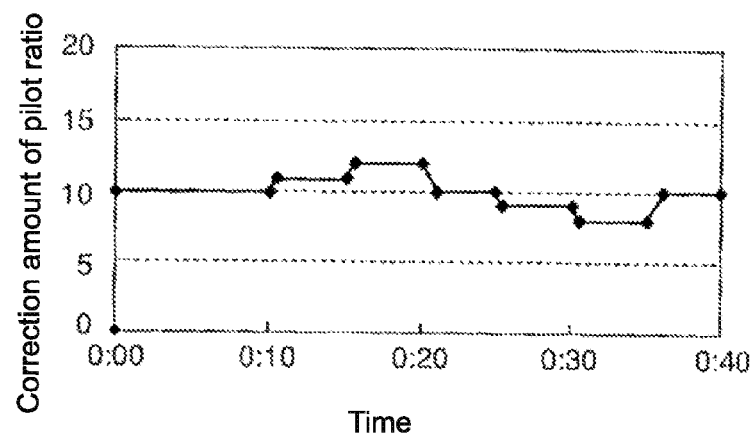
FIG. 15 shows an example as to an automatic searching.
Figure 16:
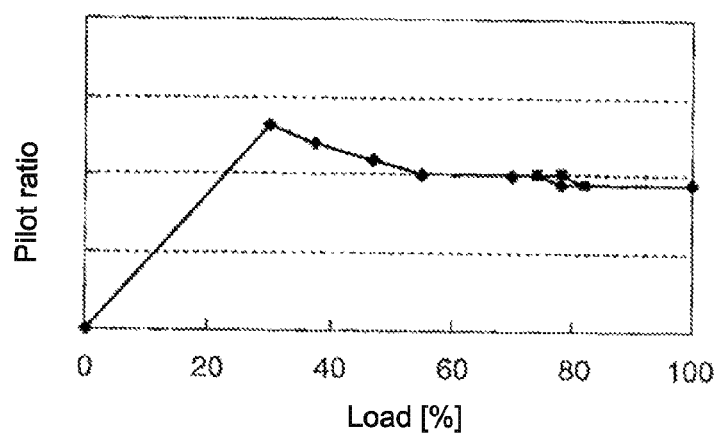
FIG. 16 shows an example as to an automatic searching.
Figure 17:
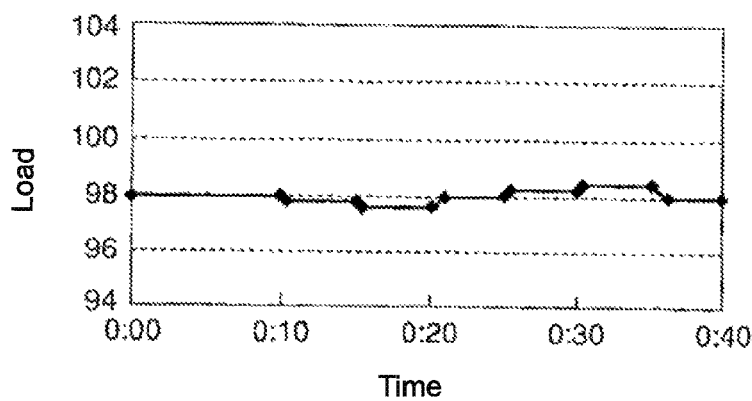
FIG. 17 shows an example problem (subject) in the conventional technology.

Further, if the searching is judged to be unfinished at the step S18, the step S18 is followed by the step S19 where the correction amount determining means 16 solves a to-be-adjusted operation condition (which is called a trial solution point herein). In the following the step S21, the output means 17 outputs the data of the adjustment direction and amount in response to the operation condition (the trial solution point). In order to reach the to-be-searched operation condition, the process flow in FIG. 2 is repeated, and the trial solution point is modified (determined in a repeated cycle) in the step S19 in the repeated process flow, by adjusting an actuating variable to an actuating variable in turn in the corresponding searching area. Further, in the step S21, the change as to the load to be absorbed by the gas turbine is also estimated. More in detail, at least one of the fuel flow rate toward the combustor 23 or the airflow rate toward the combustor 23 are adjusted step by step by an increment as explained in FIG. 15.

In this way, when an optimal operation condition is searched, the load change according to the searched condition is estimated in response to the adjustment as to at least one of the fuel flow rate toward the combustor or the airflow rate toward the combustor, by use of the data regarding the load sensitivity coefficients that are the influence coefficient of the control inputs (the actuating variables of the gas turbine) over the load change; wherein, the actuating variables are the fuel flow rate, the airflow rate, the pilot ratio, the top-hat ratio and so on; and, the sensitivity coefficients are readable from the second database 18. Thus, with an estimation regarding the load change, the actuating variables are adjusted.

As described above, in the gas turbine control method and device according to the present invention, the optimal operation condition is searched by changing the actuating variables such as the pilot ratio on the basis that the actuating variables are linked with the load sensitivity coefficient thereof; in response to the searched operation condition, the load change due to the change of the fuel flow rate toward the combustor 23 and/or the airflow rate toward the combustor is estimated; based on the result of the estimation as to the load change, the gas turbine operation is adjusted. Thus, the gas turbine is prevented from continuing abnormal operation states (irregular operation states) in which the fuel flow rate or airflow rate deviates from the ideal condition (or standard operating points/standard operating line or zone) that is assumed in the design stage. In this way, the gas turbine is free from a difficulty that the conventional gas turbine often encounters.

Second Embodiment

Figure 3:
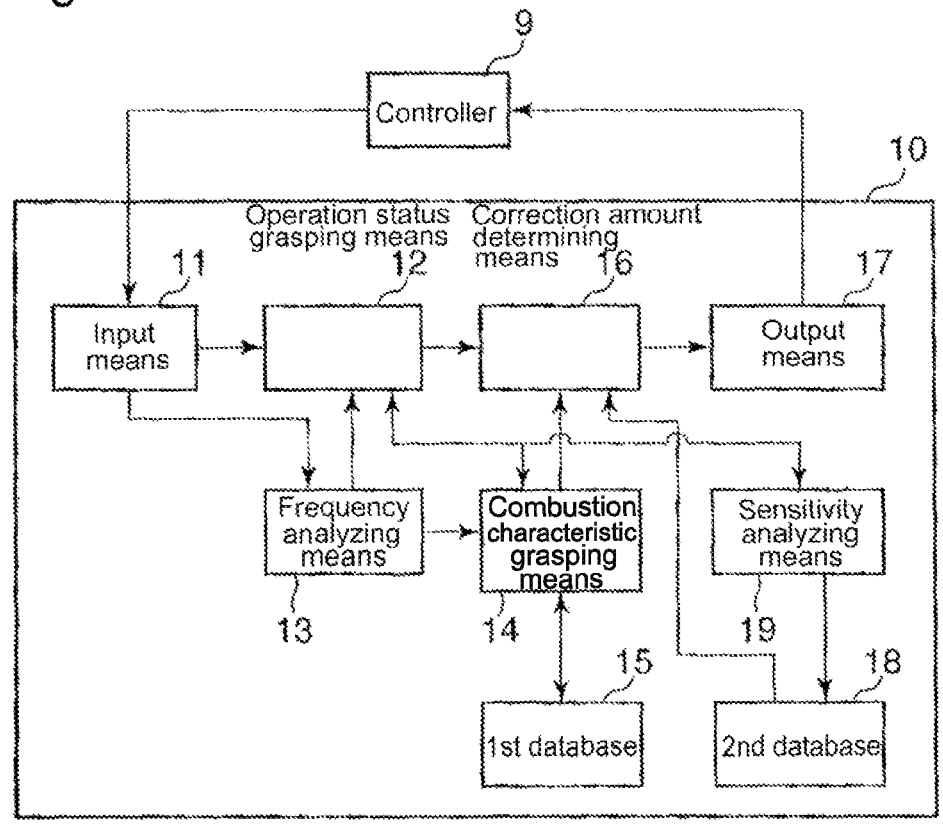
FIG. 3 is a detailed block diagram as to an automatic tuning section (a search control section) 10 in relation to FIG. 1(A) that shows the functional configuration as to the gas turbine control method according to the present invention.
Figure 4:
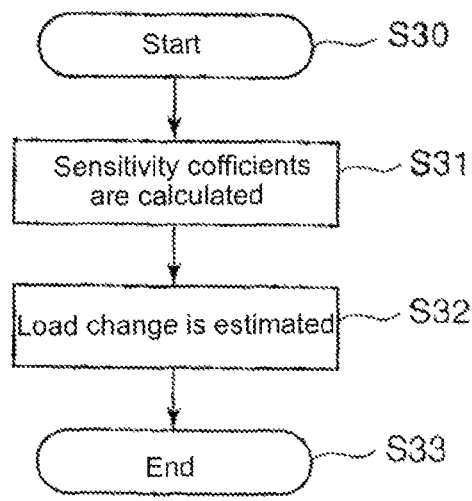
FIG. 4 shows a flow diagram as to a gas turbine control method of a second embodiment according to the present invention.

In the next place, the second embodiment according to the present embodiment is now explained in consultation with FIGS. 3, 4 and 9. FIG. 3 is a detailed block diagram as to an automatic tuning section 10 in relation to FIG. 1(A) that shows the functional configuration as to the gas turbine control method according to the present invention; FIG. 4 shows a flow diagram as to a gas turbine control method of a second embodiment according to the present invention; FIG. 9 shows a configuration example as to a database used in the second embodiment according to the present invention.

In the first embodiment that has been explained, the data as to the sensitivity coefficients are collected beforehand, and the obtained data and the numerical (alphanumeric) values thereof are stored in the second database 18 so as to be used for the gas turbine control. In this manner, however, the calculations and the calculated-data storage as to the sensitivity coefficients depend on the manpower; thereby, the data cannot be renewed, unless the data are newly collected and the old data are replaced by the newly collected data. Thus, the stored data remains the same even in a case where the compressor performance is deteriorated or the (air) filter is clogged due to the secular change of the gas turbine. Consequently, the gas turbine performance might deviate from the performance of the initial design stage, the combustion stability might be deteriorated, and the combustion vibrations might occur.

In order to overcome these potential difficulties, the gas turbine control device (as well as the method thereof) according to the second embodiment of the present invention is provided with a sensitivity analyzing means 19 that calculates the sensitivity coefficients on the basis of the data as to actuating variables, operation status signals and a gas turbine load, while the gas turbine is being operated, and the sensitivity analyzing means 19 stores the calculated data as to the sensitivity coefficients in a second database 18. Incidentally, the sensitivity analyzing means 19 is shown in FIG. 3.

The sensitivity analyzing means 19 that is shown in FIG. 3 receives the data such as a bypass valve opening level, a pilot ratio, a top-hat ratio, a gas turbine load (the power output) from an operation status grasping means 12 so as to calculate a load change (the load increment change) against each actuating variable change (the variable increment change) on the basis of the received data, thereby the sensitivity coefficients are calculated and the data is stored in the second database 18. In this way, the intricate procedures for calculating the sensitivity coefficients by manpower are dispensed with; the sensitivity coefficients are automatically renewed (calculated) concurrently even when the secular change as to the gas turbine performance appears. Thus, the gas turbine can keep and enhance the combustion stability.

FIG. 4 shows the flow diagram as to the sensitivity coefficient calculation and the gas turbine power output change estimation. The flow diagram of FIG. 4 corresponds to the step S21 showing the flow diagram of the first embodiment in FIG. 2; namely, the flow diagram of FIG. 4 shows a concrete processes regarding the estimation of the load change. In a case where the step 21 in FIG. 2 jumps to a step S30 in FIG. 4, the step S31 (Calculation of Sensitivity Coefficients) is performed; thereby, the data such as the bypass valve opening level, the pilot ratio, the top-hat ratio, and the gas turbine load (the power output) are shifted from the operation status grasping means 12 to the sensitivity analyzing means 19; and, the sensitivity coefficients are calculated. In the following step S32, the gas turbine load change (the load increment change) is estimated via the procedure of the step S33 (End of Subflow), the process returns back to the main flow (e.g. the step S21 in FIG. 2). The estimated data obtained in the process flow in FIG. 4 can be used in the following steps in the main flow (e.g. the steps following the step S21 in FIG. 2). Since the steps in the main flow are already described, the explanation repetition is omitted.

INDUSTRIAL APPLICABILITY

The present invention can provide a gas turbine control method and the device thereof thereby the gas turbine efficiency of the initial design stage can be preserved for a long span of time, and the generator or the load absorbing device of the gas turbine can be efficiently operated without waste of fuel consumption.

The invention claimed is:

1. A gas turbine control method, provided with a gas turbine comprising:
   a plurality of combustors, and
   a first database that memorizes an optimal operation condition as to each combustor; and
   the gas turbine control method is used for adjusting at least one of a fuel flow rate toward the combustor and an airflow rate toward the combustor in response to the optimal operation condition,
   in a manner that the optimal operation condition is searched by fluctuating at least one of the fuel flow rate and the airflow rate, while combustion vibrations are not occurring, and
   in a manner that the memory contents of the first database are renewed with the data as to the optimal operation condition that is obtained by the searching;
   wherein,
   a second database is provided in which load sensitivity coefficients, which show a correlation between actuating variables including the fuel flow rate, the airflow rate, a pilot ratio and a top-hat ratio of the gas turbine, and a gas turbine power output, are memorized;
   a load increment change in response to actuating variables including at least one of the fuel flow rate toward the combustor and the airflow rate toward the combustor is estimated according to the optimal operation conditions obtained by the searching by use of the load sensitivity coefficients; and
   at least one of the fuel flow rate and the airflow rate is adjusted on the basis of the estimation results, and the contents of the first database are renewed according to the results of the adjustments.

2. The gas turbine control method according to claim 1, wherein
   the load sensitivity coefficients are calculated on the basis of the actuating variables, operation status signals and a gas turbine load while the gas turbine is being operated, in which the actuating variables include the airflow rate, the pilot ratio and the top-hat ratio, and the operation status signals include atmosphere conditions and the gas turbine load, and
   the calculated load sensitivity coefficients are memorized and renewed in the second database.

3. A gas turbine control device, provided with a gas turbine having a plurality of combustors and a first database that memorizes an optimal operation condition as to each combustor, and a correction amount determining means for performing a search control for the purpose of adjusting at least one of a fuel flow rate toward the combustor and an airflow rate toward the combustor in response to the optimal operation condition;
   in a manner that the optimal operation condition is searched by fluctuating at least one of the fuel flow rate and the airflow rate, while combustion vibrations are not occurring, and
   in a manner that the memory contents of the first database are renewed with the data as to the optimal operation condition that is obtained by the searching;
   wherein,
   a second database is provided in which load sensitivity coefficients, which show a correlation between actuating variables including the fuel flow rate, the airflow rate, a pilot ratio and a top-hat ratio of the gas turbine, and a gas turbine power output, are memorized;
   the correction amount determining means estimates a load increment change in response to actuating variables including at least one of the fuel flow rate toward the combustor and the airflow rate toward the combustor by use of the load sensitivity coefficients that are memorized in the second database, in response to the optimal operation condition obtained by fluctuating at least one of the fuel flow rate and the airflow rate during the search control; and
   at least one of the fuel flow rate and the airflow rate is adjusted on the basis of the estimation results, thereby the contents of the first database are renewed according to the results of the adjustments.

4. A gas turbine control device having a gas turbine comprising a plurality of combustors and a first database that memorizes an optimal operation condition as to each combustor, and a correction amount determining means for performing a search control for the purpose of adjusting at least one of a fuel flow rate toward the combustor and an airflow rate toward the combustor in response to the optimal operation condition;
   in a manner that the optimal operation condition is searched by fluctuating at least one of the fuel flow rate and the airflow rate, while combustion vibrations are not occurring, and
   in a manner that the memory contents of the first database are renewed with the data as to the optimal operation condition that is obtained by the searching;
   wherein the gas turbine control device further comprising:
   a sensitivity analyzing means for calculating load sensitivity coefficients, which show a correlation between actuating variables including the fuel flow rate, the airflow rate, a pilot ratio and a top-hat ratio of the gas turbine, and a gas turbine power output; and
   a second database in which the load sensitivity coefficients calculated by the sensitivity analyzing means are memorized,
   further wherein
   the correction amount determining means estimates a load increment change in response to actuating variables including at least one of the fuel flow rate toward the combustor and the airflow rate toward the combustor by use of the load sensitivity coefficients calculated by the sensitivity analyzing means or the load sensitivity coefficients that are memorized in the second database, in response to the optimal operation condition obtained by fluctuating at least one of the fuel flow rate and the airflow rate during the search control; and
   at least one of the fuel flow rate and the airflow rate is adjusted on the basis of the estimation results, thereby the contents of the first database are renewed according to the results of the adjustments.

* * * * *